(12) United States Patent
Cheng et al.

(10) Patent No.: US 9,295,055 B2
(45) Date of Patent: Mar. 22, 2016

(54) BASE STATION, USER EQUIPMENT AND METHODS THEREIN FOR CONTROL TIMING CONFIGURATION ASSIGNMENT IN A MULTIPLE CELL COMMUNICATIONS NETWORK

(75) Inventors: Jung-Fu Cheng, Fremont, CA (US); Robert Baldemair, Solna (SE); Mattias Frenne, Uppsala (SE); Dirk Gerstenberger, Stockholm (SE); Daniel Larsson, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 673 days.

(21) Appl. No.: 13/510,201

(22) PCT Filed: Jan. 31, 2012

(86) PCT No.: PCT/SE2012/050093
§ 371 (c)(1),
(2), (4) Date: May 16, 2012

(87) PCT Pub. No.: WO2013/025143
PCT Pub. Date: Feb. 21, 2013

(65) Prior Publication Data
US 2013/0136108 A1 May 30, 2013

Related U.S. Application Data

(60) Provisional application No. 61/524,859, filed on Aug. 18, 2011, provisional application No. 61/522,698, filed on Aug. 12, 2011.

(51) Int. Cl.
H04W 52/14 (2009.01)
H04W 74/00 (2009.01)
H04L 1/18 (2006.01)
(Continued)

(52) U.S. Cl.
CPC .......... *H04W 72/0446* (2013.01); *H04L 1/1861* (2013.01); *H04L 5/001* (2013.01); *H04L 5/0053* (2013.01); *H04L 5/0055* (2013.01);
(Continued)

(58) Field of Classification Search
CPC ... H04L 5/0055; H04L 1/1854; H04L 1/1896; H04W 72/042
See application file for complete search history.

(56) References Cited

U.S. PATENT DOCUMENTS

2008/0316961 A1* 12/2008 Bertrand ............. H04W 74/004
370/329
2011/0096701 A1* 4/2011 Lin ............................... 370/280

(Continued)

OTHER PUBLICATIONS

Mediatek Inc., "HARQ Feedback Mechanism in CA with Different TDD Configurations", 3GPP TSG-RAN WG1 Meeting #66bis, Zhuhai, China, Oct. 10, 2011, pp. 1-5, R1-113047, 3rd Generation Partnership Project.

(Continued)

*Primary Examiner* — Asad Nawaz
*Assistant Examiner* — Jason Harley
(74) *Attorney, Agent, or Firm* — Coats & Bennett, P.L.L.C.

(57) ABSTRACT

Example embodiments presented herein are directed towards a base station and method therein, for configuring control timing to and from a user equipment in a multiple component cell communications network. Example embodiments presented herein are also directed towards a user equipment and method therein, for configuration of control timing for a user equipment in a multiple component cell communications network.

52 Claims, 23 Drawing Sheets

(51) Int. Cl.
   *H04L 5/14* (2006.01)
   *H04W 72/04* (2009.01)
   *H04L 5/00* (2006.01)
   *H04L 5/16* (2006.01)
(52) U.S. Cl.
   CPC ............... *H04L5/1469* (2013.01); *H04L 5/16* (2013.01); *H04W 72/042* (2013.01)

(56) References Cited

U.S. PATENT DOCUMENTS

| | | | |
|---|---|---|---|
| 2011/0141985 A1* | 6/2011 | Larsson | H04L 5/0064 370/329 |
| 2012/0307689 A1* | 12/2012 | Kim | H04L 1/1861 370/280 |
| 2012/0327843 A1* | 12/2012 | Kim et al. | 370/315 |
| 2013/0003664 A1 | 1/2013 | Frenne et al. | |
| 2013/0028149 A1* | 1/2013 | Chen | H04L 5/0005 370/280 |
| 2013/0279460 A1* | 10/2013 | Kim | H04L 5/0057 370/329 |
| 2013/0294423 A1 | 11/2013 | Wang et al. | |

OTHER PUBLICATIONS

Huawei, et al., "Details on ACK/NACK time domain bundling for TDD", 3GPP TSG RAN WG1 Meeting #64, Taipei, Feb. 25, 2011, pp. 1-8, R1-110900, 3rd Generation Partnership Project.

Ericsoon, et al.. "Applicable scenarios for TDD CA of different UL-DL configurations", 3GPP TSG-RAN WG1 #66b1s, Zhuhai, China, Oct. 10, 2011, pp. 1-6, R1-113532, 3rd Generation Partnership Project.

Catt, "HARQ and Cross-carrier Scheduling for Different TDD Configurations", 3GPP TSG RAN WG2 Meeting #74, Barcelona, Spain, May 9, 2011, pp. 1-3, R2-112798, 3rd Generation Partnership Project.

Intel Corporation, "Support of Mixed Inter-Band TDD Configurations in Rel-11 CA", 3GPP TSG RAN2#74 meeting, Barcelona, Spain, May 9, 2011, pp. 1-3, R2-113216, 3rd Generation Partnership Project.

3GPP. "Technical Specification Group Radio Access Network; Evolved Universal Terrestrial Radio Access (E-UTRA); Physical layer procedures Release 10." 3GPP TS 36.213 v10.2.0 Jun. 2011. 3GPP, Sophia Antipolis, France.

Nokia Siemens Networks, Nokia Corporation. "Cell specific TDD configuration with inter-band CA." 3GPP TSG-RAN WG2 Meeting #74. Barcelona, Spain. May 9-13, 2011. R2-112946. 3GPP, Sophia Antipolis, France.

Renesas Mobile Europe. "Operation Principles of CC specific TDD configuration." 3GPP TSG-RAN WG2 Meeting #74. Barcelona, Spain. May 9-13, 2011. R2-112938. 3GPP, Sophia Antipolis, France.

Office Action, English translation of, Application No. JP 2014-524966. 1 page. Date of mailing: Dec. 4, 2015. Japan Patent Office, Tokyo, Japan.

* cited by examiner

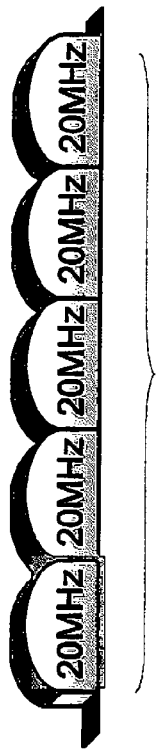
FIGURE 5
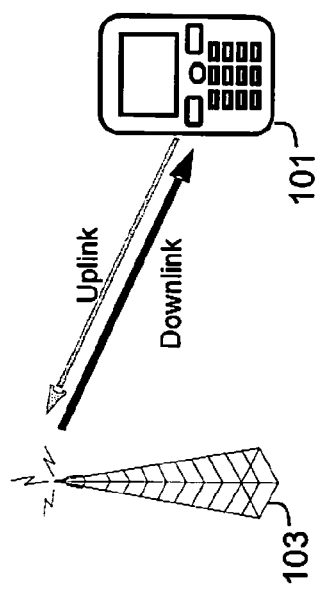
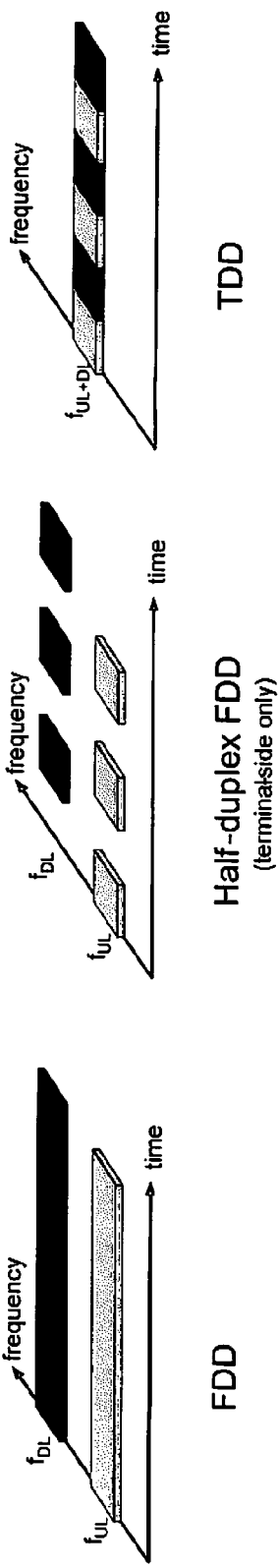
FIGURE 6

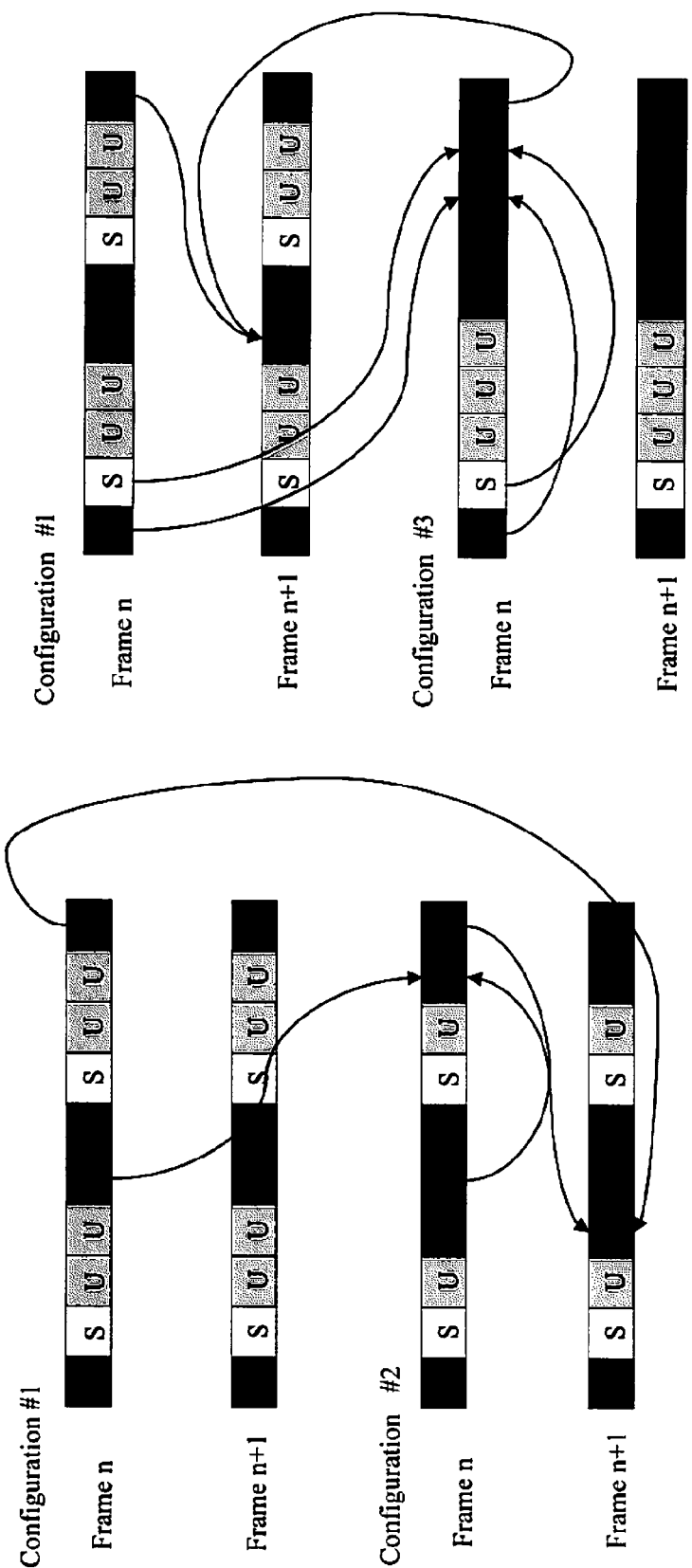

BASE STATION, USER EQUIPMENT AND METHODS THEREIN FOR CONTROL TIMING CONFIGURATION ASSIGNMENT IN A MULTIPLE CELL COMMUNICATIONS NETWORK

TECHNICAL FIELD

Example embodiments are directed towards a base station and user equipment, and methods therein, for the assignment and implementation of a control timing configuration number for control timing in a multiple cell communications network.

BACKGROUND

Long Term Evolution Systems

Long Term Evolution (LTE) uses Orthogonal Frequency Division Multiplexing (OFDM) in the downlink direction and a Discrete Fourier Transform (DFT)-spread OFDM in the uplink direction. The basic LTE downlink physical resource can thus be seen as a time-frequency grid as illustrated in FIG. 1, where each resource element corresponds to one OFDM subcarrier during one OFDM symbol interval. In the time domain, LTE downlink transmissions may be organized into radio frames of 10 ms, with each radio frame consisting of ten equally-sized subframes of length Tsubframe=1 ms, as illustrated in FIG. 2.

Furthermore, the resource allocation in LTE is typically described in terms of resource blocks, where a resource block corresponds to one slot (0.5 ms) in the time domain and 12 subcarriers in the frequency domain. Resource blocks are numbered in the frequency domain, starting with 0 from one end of the system bandwidth.

Downlink transmissions are dynamically scheduled, i.e., in each subframe the base station transmits control information about to which user equipments data is transmitted and upon which resource blocks the data is transmitted, in the current downlink subframe. This control signaling is typically transmitted in the first 1, 2, 3 or 4 OFDM symbols in each subframe. A downlink system with 3 OFDM symbols for control purposes is illustrated in FIG. 3. The dynamic scheduling information is communicated to the user equipments via a Physical Downlink Control Channel (PDCCH) transmitted in the control region. After successful decoding of a PDCCH, the user equipment shall perform reception of the Physical Downlink Shared Channel (PDSCH) or transmission of the Physical Uplink Shared Channel (PUSCH) according to predetermined timing specified in the LTE specifications.

LTE uses a Hybrid-Automatic Repeat Request (HARQ), where, after receiving downlink data in a subframe, the user equipment attempts to decode it and reports to the base station whether the decoding was successful, sending an Acknowledge (ACK), or not, sending a Non-Acknowledgement (NACK) via the Physical Uplink Control CHannel (PUCCH). In case of an unsuccessful decoding attempt, the base station can retransmit the erroneous data. Similarly, the base station can indicate to the UE whether the decoding of the PUSCH was successful, sending an ACK, or not, sending a NACK, via the Physical Hybrid ARQ Indicator CHannel (PHICH).

Uplink control signaling from the user equipment to the base station may comprise (1) HARQ acknowledgements for received downlink data; (2) user equipment reports related to the downlink channel conditions, used as assistance for the downlink scheduling; and/or (3) scheduling requests, indicating that a mobile user equipment needs uplink resources for uplink data transmissions.

If the mobile user equipment has not been assigned an uplink resource for data transmission, the L1/L2 control information, such as channel-status reports, HARQ acknowledgments, and scheduling requests, is transmitted in uplink resources e.g. in resource blocks, specifically assigned for uplink L1/L2 control on Release 8 (Rel-8) PUCCH. As illustrated in FIG. 4, these uplink resources are located at the edges of the total available transmission bandwidth. Each such uplink resource comprises 12 "subcarriers" (one resource block) within each of the two slots of an uplink subframe. In order to provide frequency diversity, these frequency resources are frequency hopping, indicated by the arrow, on the slot boundary, i.e. one "resource" comprises 12 subcarriers at the upper part of the spectrum within the first slot of a subframe and an equally sized resource at the lower part of the spectrum during the second slot of the subframe or vice versa. If more resources are needed for the uplink L1/L2 control signaling, e.g. in case of very large overall transmission bandwidth supporting a large number of users, additional resources blocks can be assigned next to the previously assigned resource blocks.

Carrier Aggregation

The LTE Release 10 (Rel-10) standard has recently been standardized, supporting bandwidths larger than 20 MHz. One requirement on LTE Rel-10 is to assure backward compatibility with LTE Rel-8. This may also include spectrum compatibility. That would imply that an LTE Rel-10 carrier, wider than 20 MHz, should appear as a number of LTE carriers to an LTE Rel-8 user equipment. Each such carrier can be referred to as a Component Carrier (CC). In particular for early LTE Rel-10 deployments it can be expected that there will be a smaller number of LTE Rel-10-capable user equipments compared to many LTE legacy user equipments. Therefore, it may be useful to assure an efficient use of a wide carrier also for legacy user equipments, i.e. that it is possible to implement carriers where legacy user equipments can be scheduled in all parts of the wideband LTE Rel-10 carrier. The straightforward way to obtain this would be by means of Carrier Aggregation (CA). CA implies that an LTE Rel-10 user equipment can receive multiple CCs, where the CCs have, or at least the possibility to have, the same structure as a Rel-8 carrier. CA is illustrated in FIG. 5.

The number of aggregated CCs as well as the bandwidth of the individual CCs may be different for uplink and downlink. A symmetric configuration refers to the case where the number of CCs in downlink and uplink is the same whereas an asymmetric configuration refers to the case that the number of CCs is different. It should be noted that the number of CCs configured in a cell may be different from the number of CCs seen by a user equipment. A user equipment may for example support more downlink CCs than uplink CCs, even though the network is configured with the same number of uplink and downlink CCs.

During an initial access, a LTE Rel-10 user equipment behaves similarly to a LTE Rel-8 user equipment. Upon successful connection to the network a user equipment may—depending on its own capabilities and the network—be configured with additional CCs for uplink and downlink. Configuration is based on the Radio Resource Control (RRC). Due to the heavy signaling and rather slow speed of RRC signaling it is envisioned that a user equipment may be configured with multiple CCs even though not all of them are currently used. If a user equipment is configured on multiple CCs this would imply it has to monitor all downlink CCs for PDCCH and PDSCH. This implies a wider receiver bandwidth, higher sampling rates, etc., resulting in high power consumption.

To mitigate the above described problems, LTE Rel-10 supports activation of CCs on top of configuration. The user equipment monitors only configured and activated CCs for PDCCH and PDSCH. Since activation is based on Medium Access Control (MAC) control elements, which are faster than RRC signaling, activation/de-activation can follow the number of CCs that are required to fulfill the current data rate needs. Upon arrival of large data amounts multiple CCs are activated, used for data transmission, and de-activated if not needed anymore. All but one CC, the Downlink (DL) Primary CC (DL PCC), may be de-activated. Therefore, activation provides the possibility to configure multiple CC but only activate them on a need-to basis. Most of the time a user equipment would have one or very few CCs activated resulting in a lower reception bandwidth and thus battery consumption.

Scheduling of a CC may be done on the PDCCH via downlink assignments. Control information on the PDCCH may be formatted as a Downlink Control Information (DCI) message. In Rel-8 a user equipment may only operate with one downlink and one uplink CC. The association between downlink assignment, uplink grants and the corresponding downlink and uplink CCs is therefore clear. In Rel-10 two modes of CA should be distinguished. A first mode is very similar to the operation of multiple Rel-8 CC, a downlink assignment or uplink grant contained in a DCI message transmitted on a CC is either valid for the downlink CC itself or for associated (either via cell-specific or user equipment specific linking) uplink CC. A second mode of operation augments a DCI message with the Carrier Indicator Field (CIF). A DCI comprising a downlink assignment with CIF is valid for that downlink CC indicted with CIF and a DCI comprising an uplink grant with CIF is valid for the indicated uplink CC.

DCI messages for downlink assignments comprise among others resource block assignment, modulation and coding scheme related parameters, HARQ redundancy version, etc. In addition to those parameters that relate to the actual downlink transmission, most DCI formats for downlink assignments also comprise a bit field for Transmit Power Control (TPC) commands. These TPC commands are used to control the uplink power control behavior of the corresponding PUCCH that is used to transmit the HARQ feedback.

In Rel-10 LTE, the transmission of PUCCH is mapped onto one specific uplink CC, the Uplink (UL) Primary CC (UL PCC). User equipments configured with a single downlink CC (which is then the DL PCC) and uplink CC (which is then the UL PCC) are operating dynamic ACK/NACK on PUCCH according to Rel-8. The first Control Channel Element (CCE) used to transmit PDCCH for the downlink assignment determines the dynamic ACK/NACK resource on Rel-8 PUCCH. Since only one downlink CC is cell-specifically linked with the UL PCC, no PUCCH collisions can occur since all PDCCH are transmitted using different first CCE.

Upon reception of downlink assignments on a single Secondary CC (SCC) or reception of multiple DL assignments, CA PUCCH should be used. A downlink SCC assignment alone is untypical. The scheduler in the base station should strive to schedule a single downlink CC assignment on the DL PCC and try to de-activate SCCs if not needed. A possible scenario that may occur is that the base station schedules user equipment on multiple downlink CCs including the PCC. If the user equipment misses all but the DL PCC assignment it will use Rel-8 PUCCH instead of CA PUCCH. To detect this error case the base station has to monitor both the Rel-8 PUCCH and the CA PUCCH.

In Rel-10 LTE, the CA PUCCH format is based on the number of configured CCs. Configuration of CCs is based on RRC signaling. After successful reception/application of the new configuration a confirmation message is sent back making RRC signaling very safe.

Time Division Duplex

Transmission and reception from a node, e.g. user equipment in a cellular system such as LTE, can be multiplexed in the frequency domain or in the time domain (or combinations thereof). Frequency Division Duplex (FDD) as illustrated to the left in FIG. 6 implies that downlink and uplink transmissions take place in different, sufficiently separated, frequency bands. Time Division Duplex (TDD), as illustrated to the right in FIG. 6, implies that downlink and uplink transmissions take place in different, non-overlapping time slots. Thus, TDD can operate in unpaired spectrum, whereas FDD requires paired spectrum.

Typically, the structure of the transmitted signal in a communication system is organized in the form of a frame structure. For example, LTE uses ten equally-sized subframes of length 1 ms per radio frame as illustrated in FIG. 7.

In the case of FDD operation (upper part of FIG. 7), there are two carrier frequencies, one for uplink transmission ($f_{UL}$) and one for downlink transmission ($f_{DL}$). At least with respect to the user equipment in a cellular communication system, FDD can be either full duplex or half duplex. In the full duplex case, a user equipment can transmit and receive simultaneously, while in half-duplex operation, the user equipment cannot transmit and receive simultaneously (the base station is capable of simultaneous reception/transmission though, e.g. receiving from one user equipment while simultaneously transmitting to another user equipment). In LTE, a half-duplex user equipment is monitoring/receiving in the downlink except when explicitly being instructed to transmit in a certain subframe.

In the case of TDD operation (lower part of FIG. 7), there may be only a single carrier frequency and uplink and downlink transmissions are typically separated in time on a cell basis. As the same carrier frequency is used for uplink and downlink transmission, both the base station and the mobile user equipments need to switch from transmission to reception and vice versa. An aspect of any TDD system is to provide the possibility for a sufficiently large guard time where neither downlink nor uplink transmissions occur. This is required to avoid interference between uplink and downlink transmissions. For LTE, this guard time is provided by special subframes (subframe 1 and, in some cases, subframe 6), which are split into three parts: a downlink part, a Downlink Pilot Time Slot (DwPTS), a guard period (GP), and an uplink part, an Uplink Pilot Time Slot (UpPTS). The remaining subframes are either allocated to uplink or downlink transmission.

SUMMARY

An object of some of the example embodiments presented herein is to provide an efficient means of assigning uplink-downlink configurations a cross all aggregated CCs. Accordingly, some of the example embodiments may be directed towards a method, in a base station, for configuring control timing to and from a user equipment in a multiple cell communications network. The method comprises determining at least one timing configuration number for a plurality of aggregated cells of the multiple cell communications network. Each aggregated cell is associated with an uplink-downlink configuration number, where at least two uplink-downlink configuration numbers of the plurality of aggregated cells are not equal. The plurality of aggregated cells is associated with the user equipment. The method also comprises assigning the at least one timing configuration number to the user equipment.

Some of the example embodiments may be directed towards a base station for configuring control timing to and from a user equipment in a multiple cell communications network. The base station comprises a determination unit configured to determine at least one timing configuration number for a plurality of aggregated cells of the multiple cell communications network. Each aggregated cell is associated with an uplink-downlink configuration number. At least two uplink-downlink configuration numbers of the plurality of aggregated cells are not equal. The plurality of aggregated cells is associated with the user equipment. The base station also comprises an assignment unit configured to assign the at least one timing configuration number to the user equipment.

Some of the example embodiments may be directed towards a method, in a user equipment, for a configuration of control timing for a user equipment in a multiple cell communications network. The method comprises receiving, from a base station, at least one timing configuration number for a plurality of aggregated cells of the multiple cell communications network. Each aggregated cell is associated with an uplink-downlink configuration number, and where at least two uplink-downlink configuration numbers of the plurality of aggregated cells are not equal. The plurality of aggregated cells is associated with the user equipment. The method also comprises implementing control timing based on the at least one timing configuration number.

Some of the example embodiments may be directed towards a user equipment, for a configuration of control timing for a user equipment in a multiple cell communications network. The user equipment comprises a determining unit configured to receive, from a base station, at least one timing configuration number for a plurality of aggregated cells of the multiple cell communications network, where each aggregated cell is associated with an uplink-downlink configuration number, and where at least two uplink-downlink configuration numbers of the plurality of aggregated cells are not equal. The plurality of aggregated cells is associated with the user equipment. The user equipment also comprises an implementation unit configured to implement control timing based on the at least one timing configuration number.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 5 is an illustrative example of carrier aggregation;

FIG. 6 is an illustrative example of frequency and time-division duplex;

FIG. 22 is an illustrative example of the timing of additional forward-subframe DL scheduling PDCCHs in support of half-duplex UEs with aggregation of a configuration 1 cell and a configuration 2 cell, according to some of the example embodiments;

FIG. 23 is an illustrative example of the timing of additional forward-subframe DL scheduling PDCCHs in support of half-duplex UEs with aggregation of a configuration 1 cell and a configuration 3 cell, according to some of the example embodiments;

DETAILED DESCRIPTION

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

Figure 1:
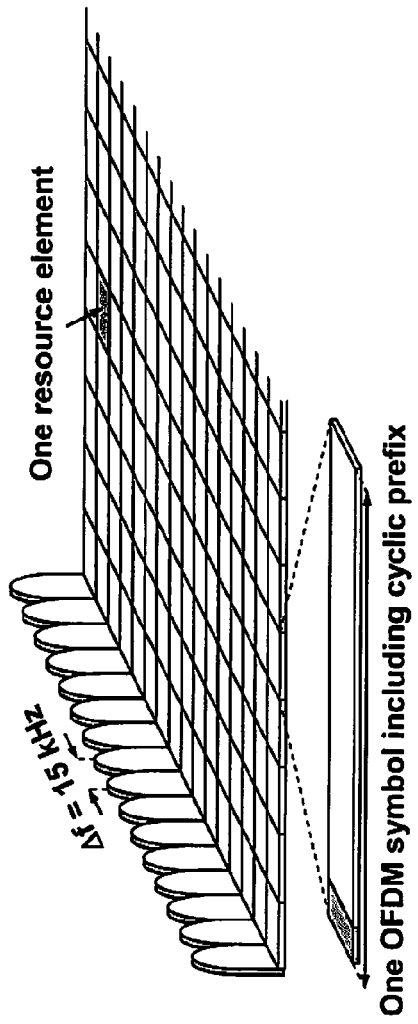
FIG. 1 is an illustrative example of a LTE downlink physical resource.
Figure 2:
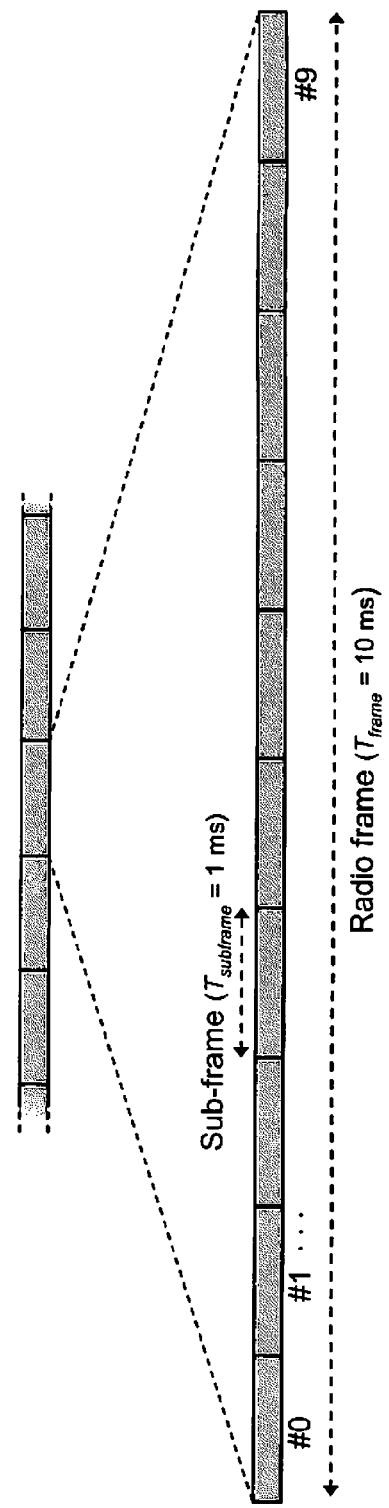
FIG. 2 is a schematic of a LTE time-domain structure.
Figure 3:
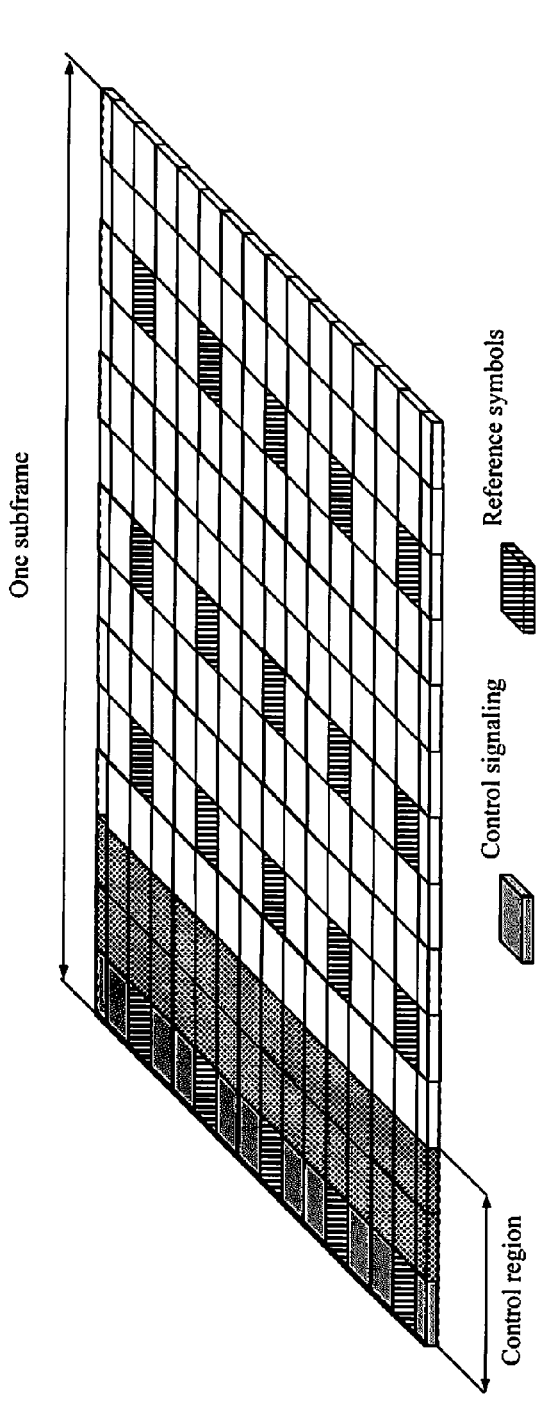
FIG. 3 is an illustration of a downlink subframe.
Figure 4:
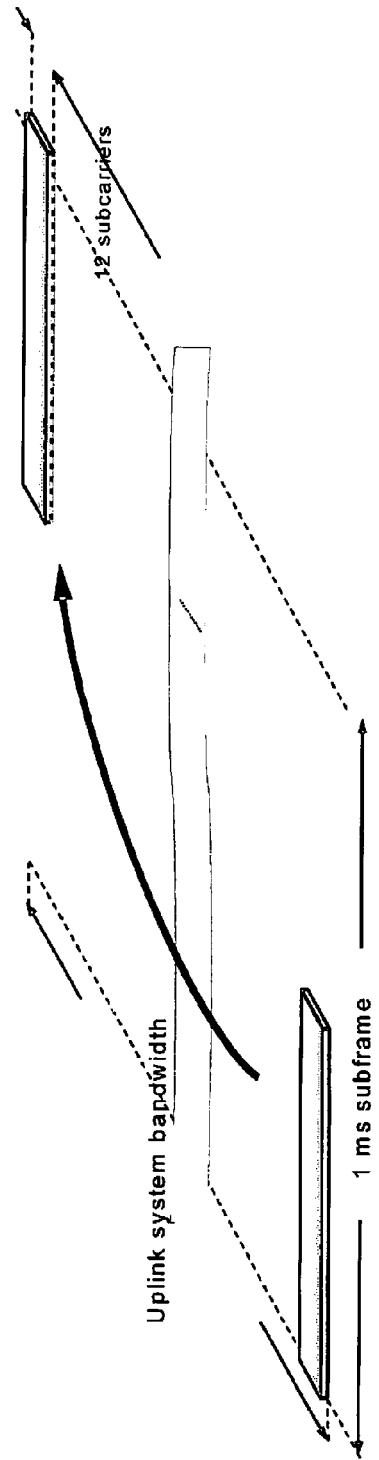
FIG. 4 is an illustrative example of an uplink L1/L2 control signalling transmission on Rel-8 PUCCH.
Figure 7:
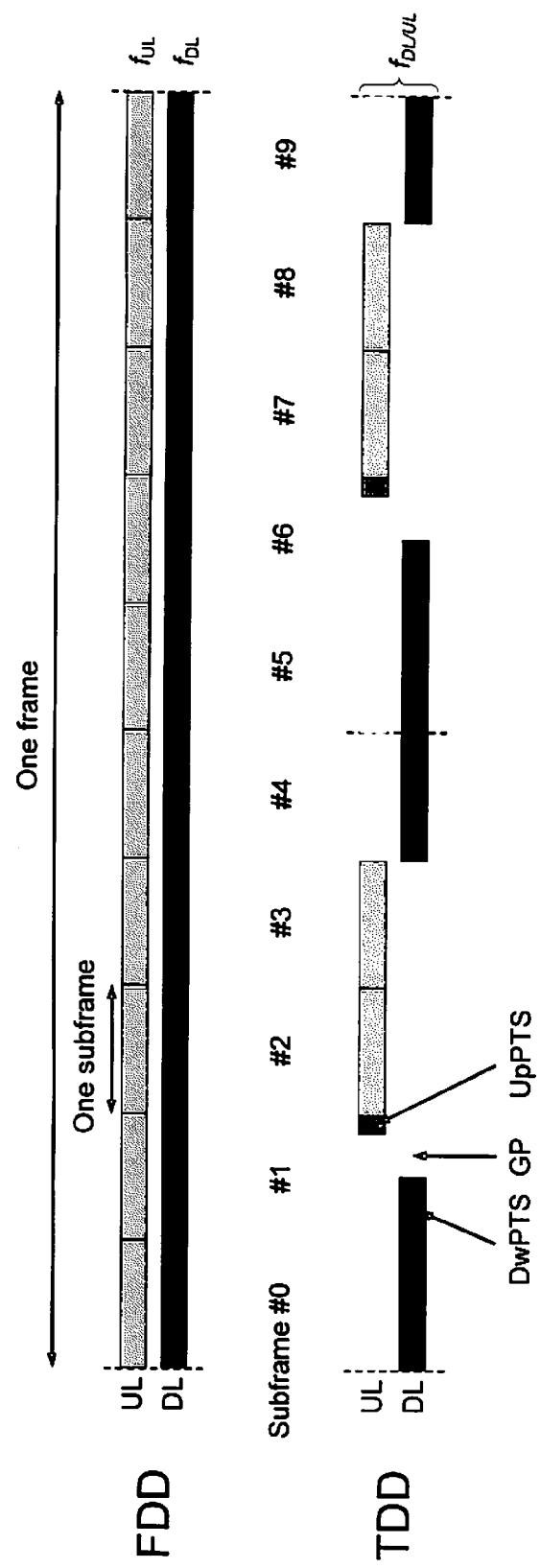
FIG. 7 is a schematic of an uplink-downlink time/frequency structure for LTE for the case of FDD and TDD.
Figure 8:
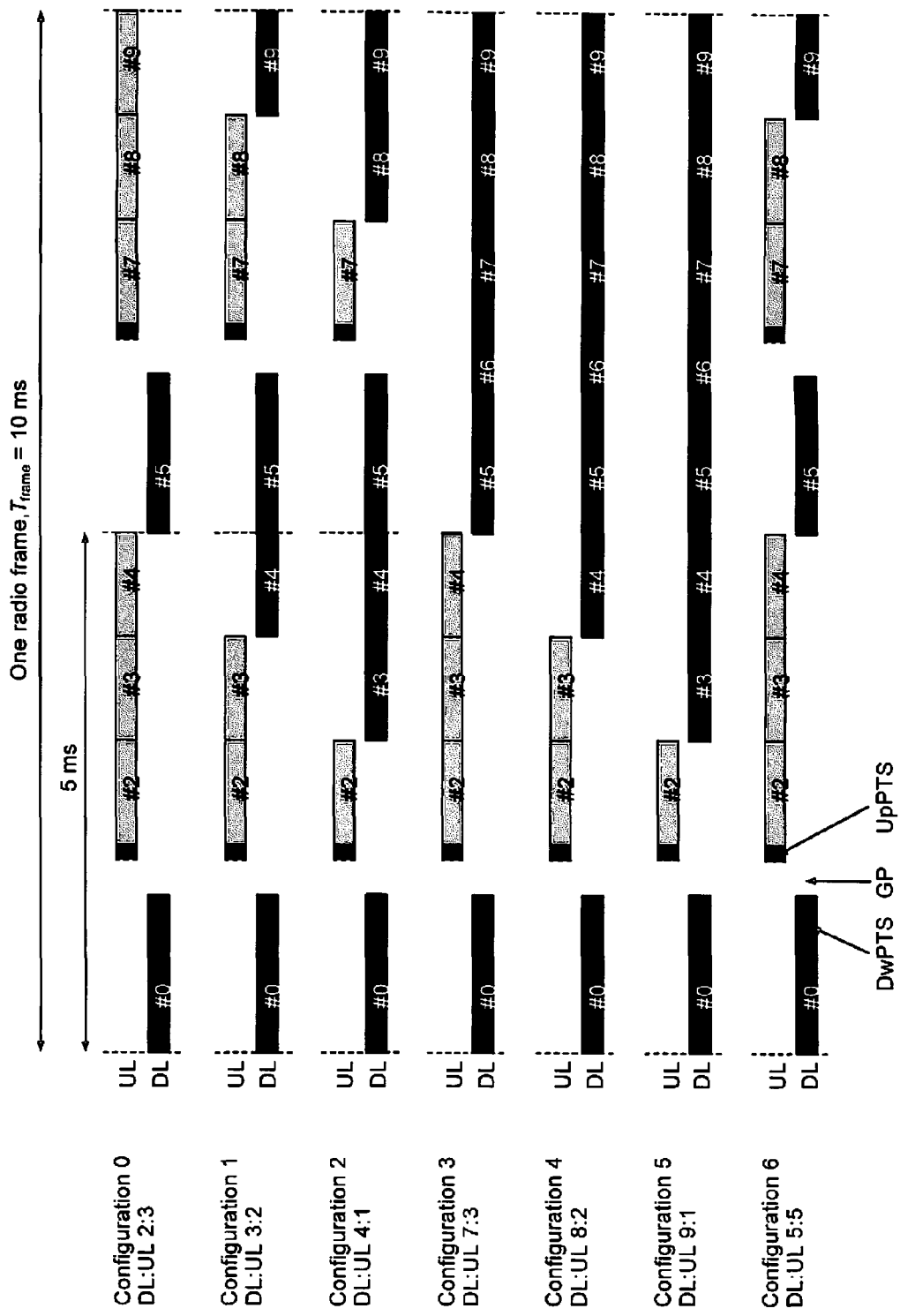
FIG. 8 is a schematic of different downlink/uplink configurations for the case of TDD.

As part of the development of the example embodiments presented herein, a problem will first be identified and discussed. TDD allows for different asymmetries in terms of the amount of resources allocated for uplink and downlink transmission, respectively, by means of different downlink/uplink configurations. In LTE, there are seven different configurations as shown in FIG. 8. Note that in the description below, under the heading 'TDD HARQ Timing', a downlink subframe may mean either downlink or the special subframe.

Figure 9:
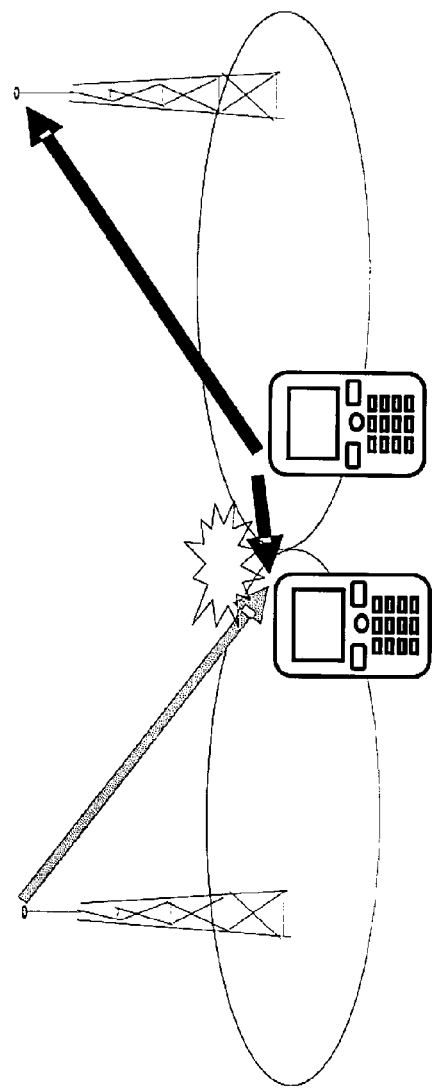
FIG. 9 is an illustrative example of uplink-downlink interference in TDD.

To avoid severe interference between downlink and uplink transmissions between different cells, neighbor cells should have the same downlink/uplink configuration. If this is not done, uplink transmission in one cell may interfere with downlink transmission in the neighboring cell and vice versa as illustrated in FIG. 9. Hence, the downlink/uplink asymmetry may typically not vary between cells, but is signaled as part of the system information and remains fixed for a long period of time.

The description provided herein is arranged as follows. First, an overview of current systems and methods for control timing configuration is presented under the heading 'Existing Systems—TDD HARQ Control Timing'. Thereafter, limitations of the existing systems are explored under the subheading 'Problems with Existing Solutions'.

A basis for the example embodiments is thereafter presented in the section entitled 'Subframe Timing Compatibility', where complex configuration tables (explained in 'Existing Systems—TDD HARQ Control Timing') may be replaced with the use of a subframe timing compatibility hierarchy. Thereafter, examples of control timing configuration assignment, utilizing the subframe timing compatibility hierarchy, are provided in the sub-section entitled 'Configuration Assignment'. Examples of control timing configuration assignment based on an ordered listing of the subframe timing compatibility hierarchy is provided in the sub-section 'Computation of the Subframe Timing Compatibility based on Efficient Storage.'

Thereafter, examples of control timing configuration assignment of user equipments utilizing a half-duplex mode of operation are provided in the sub-section 'Examples of Half-Duplex Configuration Assignment'. Similarly, examples of control timing configuration assignment of user equipments utilizing a full-duplex mode of operation are provided in the sub-section 'Examples of Full-Duplex Configuration Assignment'. Thereafter examples of forward downlink scheduling with respect to user equipments with full and half-duplex modes of operation is provided under the sub-heading 'Examples of Forward Downlink Scheduling'.

Finally, examples of network node configurations and example operations of such nodes are presented under the sub-headings 'Example Node Configurations' and 'Example Node Operations'. It should be appreciated that the example node operations provide a generalized explanation of node operations which may encompass all of the examples provided in the foregoing sub-headings which are not related to existing systems.

Existing Systems—TDD HARQ Control Timing

The timings for HARQ ACK/NACK (A/N) feedbacks for the PUSCH and the PDSCH as well as the grant of PUSCH may be specified with extensive tables and procedure descriptions for each uplink-downlink configuration.

For TDD UL/DL (U/D) configurations 1-6 and normal HARQ operation, the user equipment shall upon detection of a PDCCH with an uplink DCI format and/or a PHICH transmission in subframe n intended for the user equipment, adjust the corresponding PUSCH transmission in subframe n+k, with k given in Table 1, shown below, according to the PDCCH and PHICH information.

TABLE 1

PUSCH grant timing k for TDD configurations 0-6

| TDD U/D Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

For TDD U/D configuration 0 and normal HARQ operation the user equipment shall upon detection of a PDCCH with uplink DCI format and/or a PHICH transmission in subframe n intended for the user equipment, adjust the corresponding PUSCH transmission in subframe n+k if the Most Significant Bit (MSB) of the UL index in the PDCCH with uplink DCI format is set to 1 or PHICH is received in subframe n=0 or 5 in the resource corresponding to $I_{PHICH}=0$, with k given in Table 1. If, for TDD U/D configuration 0 and normal HARQ operation, the Least Significant Bit (LSB) of the UL index in the DCI format 0/4 is set to 1 in subframe n or a PHICH is received in subframe n=0 or 5 in the resource corresponding to $I_{PHICH}=1$, or PHICH is received in subframe n=1 or 6, the user equipment shall adjust the corresponding PUSCH transmission in subframe n+7. If, for TDD U/D configuration 0, both the MSB and LSB of the UL index in the PDCCH with uplink DCI format are sent in subframe n, the user equipment shall adjust the corresponding PUSCH transmission in both subframes n+k and n+7, with k given in Table 1.

For PUSCH transmissions scheduled from a serving cell c in subframe n, a user equipment shall determine the corresponding PHICH resource of serving cell c in subframe n+$k_{PHICH}$, where $k_{PHICH}$ is given in Table 2, provided below, for TDD. For subframe bundling operation, the corresponding PHICH resource is associated with the last subframe in the bundle.

TABLE 2

$k_{PHICH}$ for TDD

| TDD U/D Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

The user equipment shall also feedback PDSCH decoding A/N information in pre-defined UL subframes. The user equipment shall transmit such a HARQ A/N response on the PUCCH in UL subframe, if there is PDSCH transmission indicated by the detection of corresponding PDCCH or there is PDCCH indicating downlink SPS release within subframe(s) n–k, where k is within the association set K= $\{k_0, k_1, \ldots k_{M-1}\}$ listed in Table 3, provided below.

TABLE 3

Downlink association set index K: $\{k_0, k_1, \ldots k_{M-1}\}$ for TDD

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | 6 | | | 4 | | 6 | | | 4 |
| 1 | | 7, 6 | 4 | | | | 7, 6 | 4 | | |
| 2 | | 8, 7, 4, 6 | | | | | 8, 7, 4, 6 | | | |
| 3 | | 7, 6, 11 | 6, 5 | 5, 4 | | | | | | |
| 4 | | 12, 8, 7, 11 | 6, 5, 4, 7 | | | | | | | |
| 5 | | 13, 12, 9, 8, 7, 5, 4, 11, 6 | | | | | | | | |
| 6 | | 7 | 7 | | 5 | | | 7 | 7 | |

In LTERel-10, all HARQ control timings are determined based on the Primary-cell (Pcell) configuration number as discussed above. The determination of HARQ operations in LTERel-10 work only if all aggregated TDD cells have an identical U/D configuration. However, when developing the example embodiments presented herein it has been discovered that a straightforward extension of this operation for aggregation of different U/D configurations proves difficult.

Figure 10:
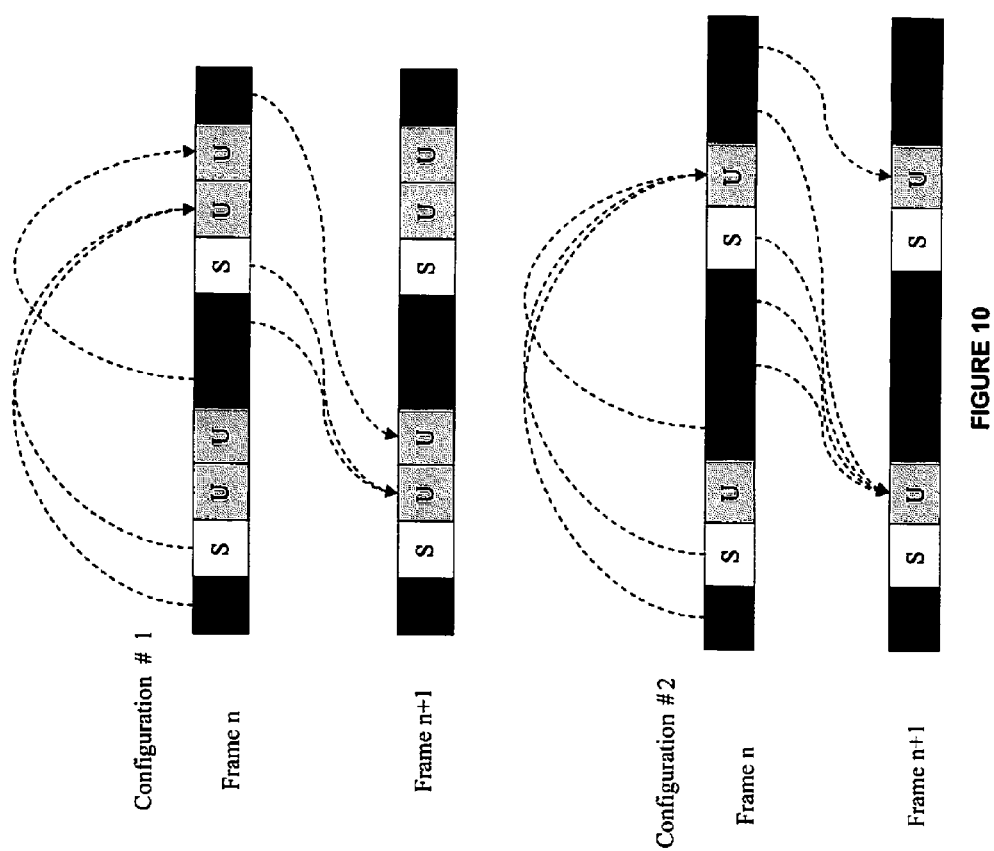
FIG. 10 is an illustration of PDSCH A/N feedback timings for a configuration 1 cell and a configuration 2 cell.

Consider the PDSCH A/N feedback timing example for aggregating a configuration 1 cell and a configuration 2 cell illustrated in FIG. 10. In FIG. 10, U represents uplink subframes, D represents downlink subframes, and S represents special subframes which may be used for both uplink and downlink. It should be appreciated that for the purpose of simplicity, the S subframes will be treated as downlink subframes in the examples provided herein.

If the configuration 2 cell is the Pcell, A/N feedback for the configuration 1 Secondary-cell (Scell) PDSCH may be fed-back based on the timing rules of Pcell. However, if the configuration 1 cell is the Pcell, there will be no A/N feedback timing rules for subframes 3 and 8 in the configuration 2 Scell.

Figure 11:
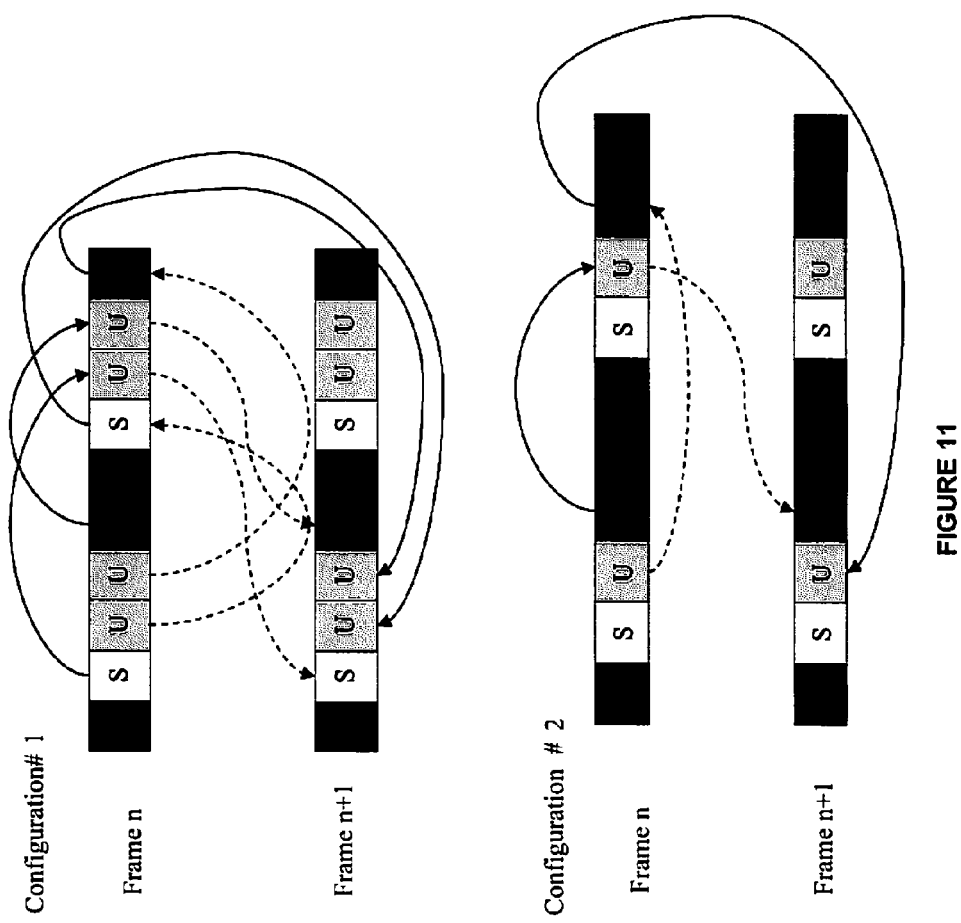
FIG. 11 is an illustration of PUSCH grant and A/N feedback timings for a configuration 1 cell and a configuration 2 cell.

Consider the PUSCH grant and A/N feedback timing example for aggregating a configuration 1 cell and a configuration 2 cell illustrated in FIG. 11. If the configuration 1 cell is the Pcell, PUSCH grant and A/N feedback for the configuration 2 Scell can be fed-back based on the timing rules of Pcell. However, if the configuration 2 cell is the Pcell, PUSCH cannot be scheduled for subframe 3 and 8 in configuration 1 Scell because ere is no such UL grant timing in configuration 2. Note that A/N feedback timing rules for these two subframes are not available, either.

The control timing problems may be even more severe than the examples discussed above. In the case of aggregating a configuration 1 and a configuration 3 cells, the HARQ control timings don't work regardless of which configuration is the Pcell.

Figure 12:
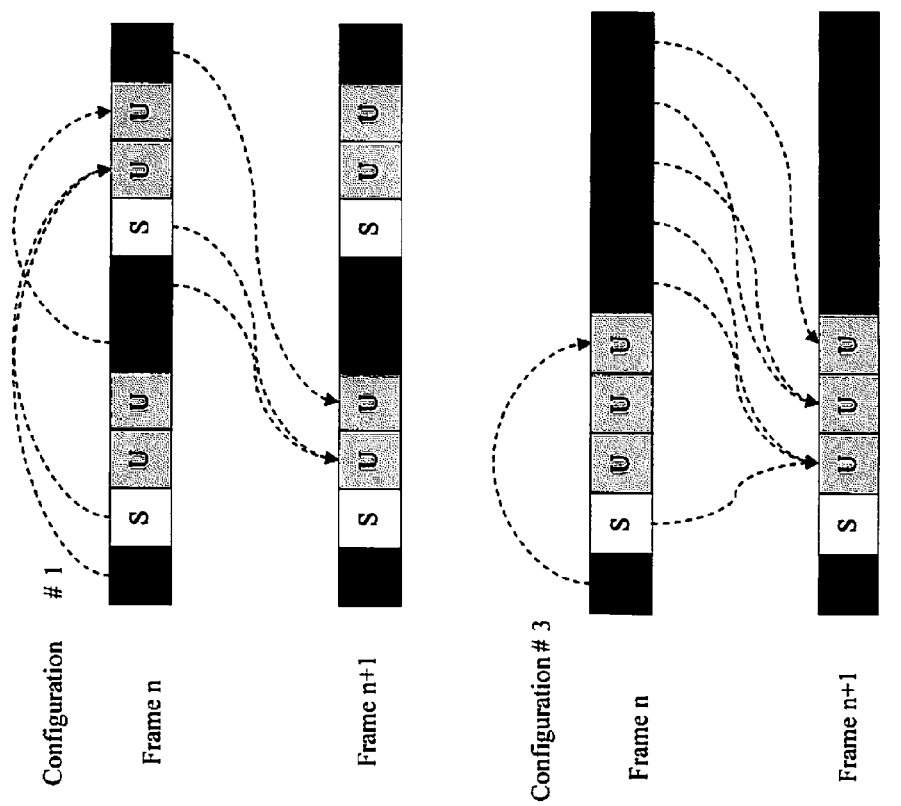
FIG. 12 is an illustration of PDSCH A/N feedback timings for a configuration 1 cell and a configuration 3 cell.
Figure 13:
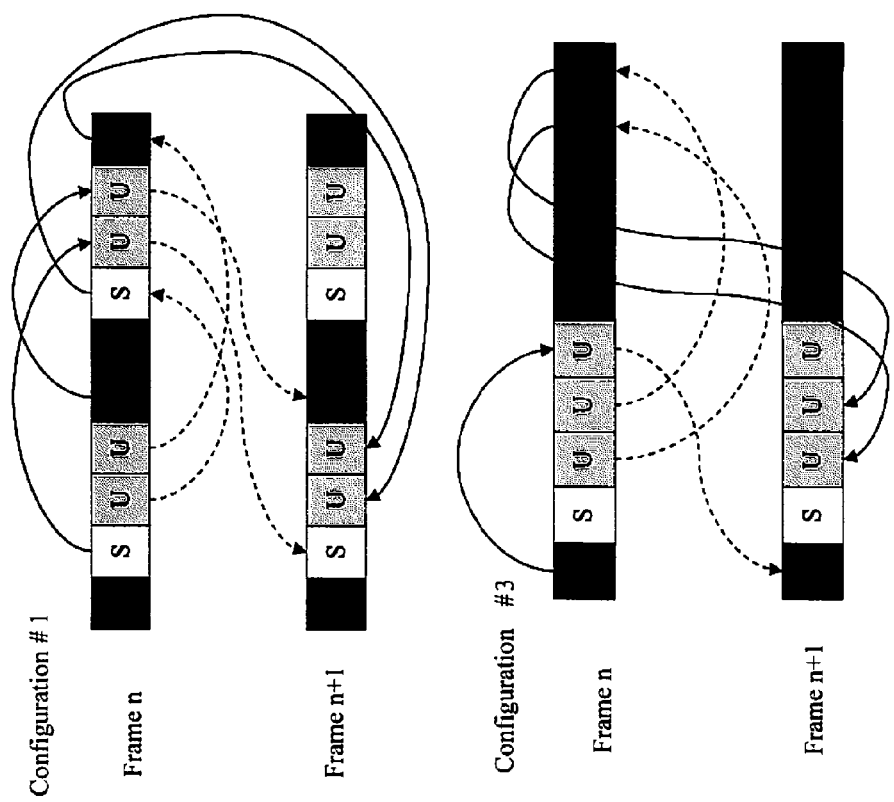
FIG. 13 is an illustration of PUSCH grant and A/N feedback timings for a configuration 1 cell and a configuration 3 cell.

More specifically, consider the PDSCH A/N feedback timing illustrated in FIG. 12:
  If configuration 1 is the Pcell, PDSCH A/N for subframes 7 & 8 of the configuration 3 Scell cannot be fed back.
  If configuration 3 is the Pcell, PDSCH A/N for subframe 4 of the configuration 1 Scell cannot be fed back.
Further, consider the PUSCH grant and A/N feedback timing illustrated in FIG. 13:
  If configuration 1 is the Pcell, PUSCH for subframe 4 in configuration 3 Scell cannot be scheduled.
  If configuration 3 is the Pcell, PUSCH for subframe 7 & 8 in configuration 1 Scell cannot be scheduled.
Problems with Existing Systems The following are examples of some of the problems with existing solutions, which have been recognized when developing the embodiments presented herein. In Rel-10, carrier aggregation of TDD cells is specified with the restriction that the U/D configurations for all the aggregated cells are identical. There is a need to allow more flexible carrier aggregation of TDD cells is to be addressed in Rel-11 of LTE.

As discussed above, the U/D configurations of neighboring cells need to be compatible to avoid severe interference problems. However, there are cases where the neighboring cells are operated by different operators or different wireless systems. The LTE TDD cells adjacent to those neighboring systems are hence required to adopt certain compatible U/D configurations. As a result, an operator may have several TDD cells having different U/D configurations on different frequencies as illustrated in FIG. 14.

Figure 14:
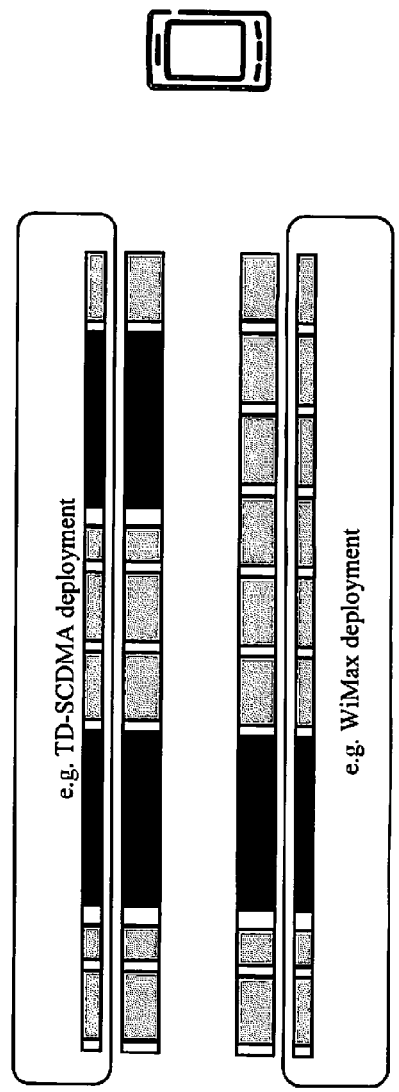
FIG. 14 is an illustrative example of carrier aggregation of TDD cells with different uplink-downlink configurations.

A further complication from such aggregation cases is that the nominally TDD user equipment may be required to transmit and receive simultaneously in certain subframes (such as subframe 7 and 8 in FIG. 14). Such FDD-like operations are incompatible with existing designs of TDD user equipments. To enable such full-duplex operations in Rel-11 may impose additional user equipment complexity and costs. It is therefore necessary to also consider possible half-duplex operations during such conflicting subframes. That is, the user equipment should be instructed to perform either reception or transmission but not both during such conflicting subframes.

To circumvent problems such those identified in the above, adding additional HARQ control timing rules based on specific aggregation cases may be performed. In additional to the existing timing rules for seven TDD configurations, $$\binom{7}{2} = 21$$

additional sets of rules may be added to specify the HARQ behaviors for every possible pair of heterogeneous configuration. On top of these, additional specification for aggregation of three different U/D configurations may also be introduced. Apparently, specifying these additional rules for supporting aggregation of different U/D configurations will substantially increase the LTE complexity and implementation costs.

Subframe Timing Compatibility

Figure 15:
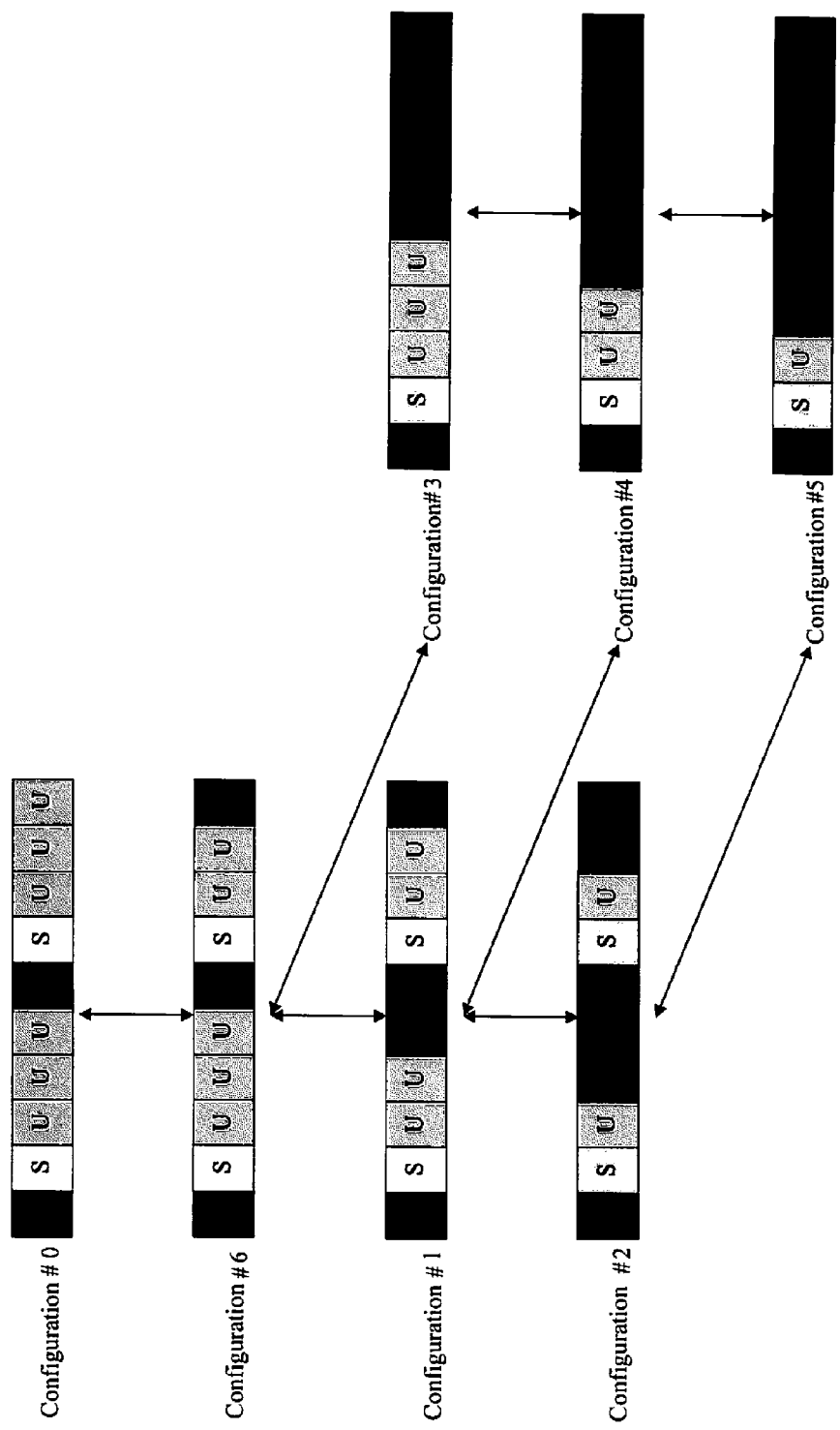
FIG. 15 is an illustrative example of subframe compatibility hierarchy, according to some of the example embodiments.

To enable a systematic solution to a plurality of aggregation scenarios with different TDD U/D configurations, according to some of the example embodiments, a subframe timing compatibility is designed and illustrated in FIG. 15. The subframe timing compatibility is a hierarchy that may be encoded as look-up tables, a linked list or a plurality of digital representations suitable for storage in communication devices.

The subframe timing compatibility hierarchy may be designed with the following principles:

(1) The UL subframes in a TDD configuration are also UL subframes in those TDD configurations that can be corrected with upward arrows.

For example, subframes 2 and 3 are UL subframes in configuration 4. These two subframes are also UL in configurations 3, 1, 6 and 0, all of which can be connected from configuration 4 with upward arrows. As a second example, subframes 2 and 7 are UL subframes in configuration 2. These two subframes are not both UL in configuration 3 because there is no upward arrow connecting the two configurations.

(2) The DL subframes in a TDD configuration are also DL subframes in those TDD configurations that can be corrected with downward arrows.

For example, subframe 0, 1, 5, 6 and 9 are DL subframes in configuration 6. These five subframes are also DL in configurations 1, 2, 3, 4 and 5, all of which can be connected from configuration 6 with downward arrows. As a second example, subframe 7 is a DL subframe in configuration 3 but not a DL subframe in configuration 2 because there is no downward arrow connecting the two configurations.

With these design properties, the subframe timing compatibility hierarchy may provide the following utility:

(1) Given a set of TDD configurations to be aggregated, a TDD configuration that can be connected from all of the given TDD configurations with upward arrows has the following two properties:

The TDD configuration comprises UL subframes that are a superset of all UL subframes from all given TDD configurations.

The TDD configuration comprises DL subframes that are available in all given TDD configurations.

Example One

Given TDD configuration 1 and 2, all subframes that are UL in either configuration 1 or 2 are also UL subframes in configuration 1, 6 and 0. The DL subframes in configuration 1, 6 or 0 are also DL subframes in configuration 1 and 2.

Given TDD configuration 1 and 3, all subframes that are UL in either configuration 1 or 3 are also UL in configuration 6 and 0. The DL subframes in configuration 6 or 0 are also DL subframes in configuration 1, 2, 3, 4, 5 and 6.

Given TDD configuration 2, 3 and 4, all subframes that are UL in any of the three configurations are also UL in configuration 6 and 0. The DL subframes in configuration 6 or 0 are also DL subframes in configuration 1, 2, 3, 4, 5 and 6.

Given a set of TDD configurations, a TDD configuration that can be connected from all of the given TDD configurations with downward arrows has the following two properties:

The TDD configuration comprises DL subframes that are a superset of all DL subframes from all given TDD configurations.

The TDD configuration comprises UL subframes that are available in all given TDD configurations.

Example Two

Given TDD configuration 1 and 2, all subframes that are DL in either configuration 1 or 2 are also DL in configuration 2 and 5. The UL subframes in configuration 2 or 5 are also UL subframes in configuration 1, 2, 6 and 0.

Given TDD configuration 1 and 3, all subframes that are DL in either configuration 1 or 3 are also DL in configuration 4 and 5. The UL subframes in configuration 4 or 5 are also UL subframes in configuration 0, 3, 4 and 6.

Given TDD configuration 2, 3 and 4, all subframes that are DL in any of the three configurations are also DL in configuration 5. The UL subframes in configuration 5 are also UL subframes in configuration 0, 1, 2, 3, 4 and 6.

Configuration Assignment

In Rel-8 TDD, the following two sets of subframe timings are set based on the same parameter, which is the serving cell U/D configuration number: (1) UL HARQ control and grant subframe timing, and (2) DL HARQ A/N subframe timing. In Rel-10 TDD CA, both types of subframe timings across all cells are set based on the same parameter, which is the Pcell U/D configuration number.

To support carrier aggregation of TDD cells with different U/D configurations, the user equipment may be configured with the following two numbers according to the teaching of the example embodiments: (1) an UL control timing configuration number for setting UL HARQ and grant timings across all aggregated cells, and (2) a DL HARQ control timing configuration number for setting DL HARQ timings across all aggregated cells.

The UL control timing configuration number may be set to the configuration number of a configuration that can be connected from all aggregated configurations with upward arrows in the subframe timing compatibility hierarchy in FIG. 15. If more than one configuration number can be chosen, the chosen setting may be the configuration at the lowest level in the subframe timing compatibility hierarchy. The chosen setting may result in more DL subframes for PUSCH grant and A/N feedback. The following example cases are provided below for the purpose of explaining some of the example embodiments.

Example Case 1:

If cells with configuration 1 and 2 are aggregated, the UL control timing configuration number can be set to 1, 6 or 0. The chosen setting may be 1.

Example Case 2:

If cells with configuration 1 and 3 are aggregated, the UL control timing configuration number can be set to 6 or 0. The chosen setting may be 6, which is different than the U/D configuration numbers of the two TDD cells.

This UL control timing configuration number setting ensures identical PUSCH grant and PHICH timings across all CCs and DL subframes are available at these timings regardless of the Pcell configuration. That is, the PUSCH grant and PHICH subframes are never in subframes with conflicting U/D directions across different CCs. This setting further ensures all UL subframes from all aggregated CCs can be scheduled either in-CC or cross-CC.

The DL HARQ control timing configuration number may be set to the configuration number of a configuration that can be connected from all aggregated configurations with downward arrows in the subframe timing compatibility hierarchy in FIG. 15. If more than one configuration number can be chosen, the chosen setting may be that of the configuration at the highest level in the subframe timing compatibility hierarchy. The chosen setting may result in more UL subframes for PDSCH A/N feedback. The following example cases are provided below for the purpose of explaining some of the example embodiments.

Example Case 1:

If cells with configuration 1 and 2 are aggregated, the DL HARQ control timing configuration number can be set to 2 or 5. The chosen setting may be 2.

Example Case 2:

If cells with configuration 1 and 3 are aggregated, the DL HARQ control timing configuration number can be set to 4 or 5. The chosen setting may be 4, which is different than the U/D configuration numbers of the two TDD cells.

This DL HARQ control timing configuration number setting ensures identical PDSCH A/N feedback timings across all CCs and UL subframes are available at these timings regardless of the Pcell configuration.

Example Carrier Aggregation of Configuration 1 and 2 TDD Cells

To support the aggregation of configuration 1 and 2 TDD cells, the two HARQ control timing configuration numbers may be set as follows:

The UL control timing configuration number may be set to 1.

The DL HARQ control timing configuration number may be set to 2.

Note these configuration number settings are applicable regardless of which of the two TDD cells serves as the Pcell.

Figure 16:
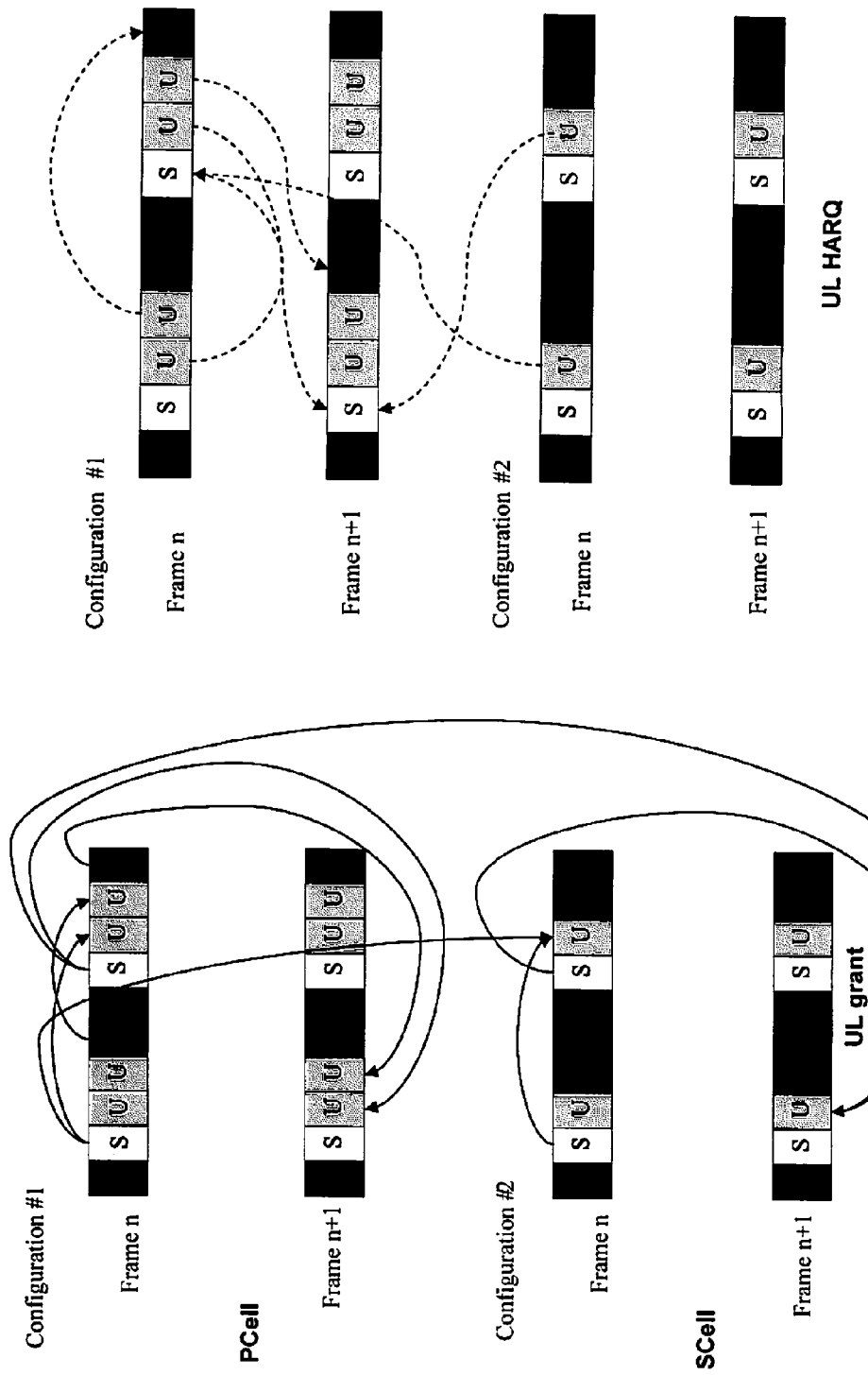
FIG. 16 is an illustration of PUSCH grant and A/N feedback timings for aggregation of a configuration 1 cell as Pcell and a configuration 2 cell as Scell, according to some of the example embodiments.
Figure 17:
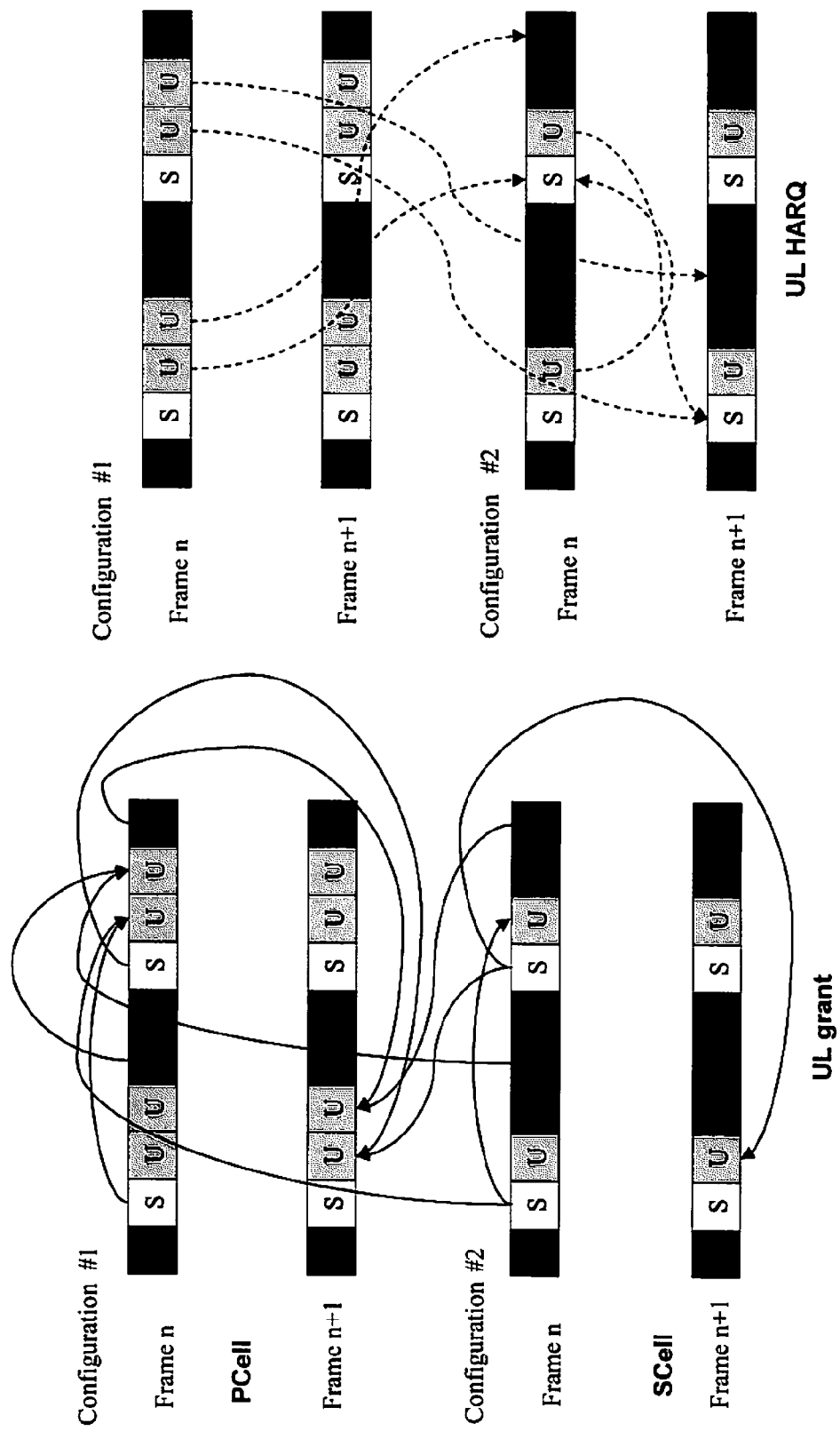
FIG. 17 is an illustration of PUSCH grant and A/N feedback timings for aggregation of a configuration 2 cell as Pcell and a configuration 1 cell as Scell, according to some of the example embodiments.

The PUSCH grant and A/N feedback timings for aggregation of a configuration 1 cell as Pcell and a configuration 2 cell as Scell are illustrated in FIG. 16. The PUSCH grant and A/N feedback timings for aggregation of a configuration 2 cell as Pcell and a configuration 1 cell as Scell are illustrated in FIG. 17. This analysis shows that all the UL subframes can be scheduled either from the Pcell (if cross-carrier scheduling is configured) or from the Scell itself (if cross-carrier scheduling is not configured). Furthermore, A/N feedback timings for all UL subframes are clearly assigned.

Figure 18:
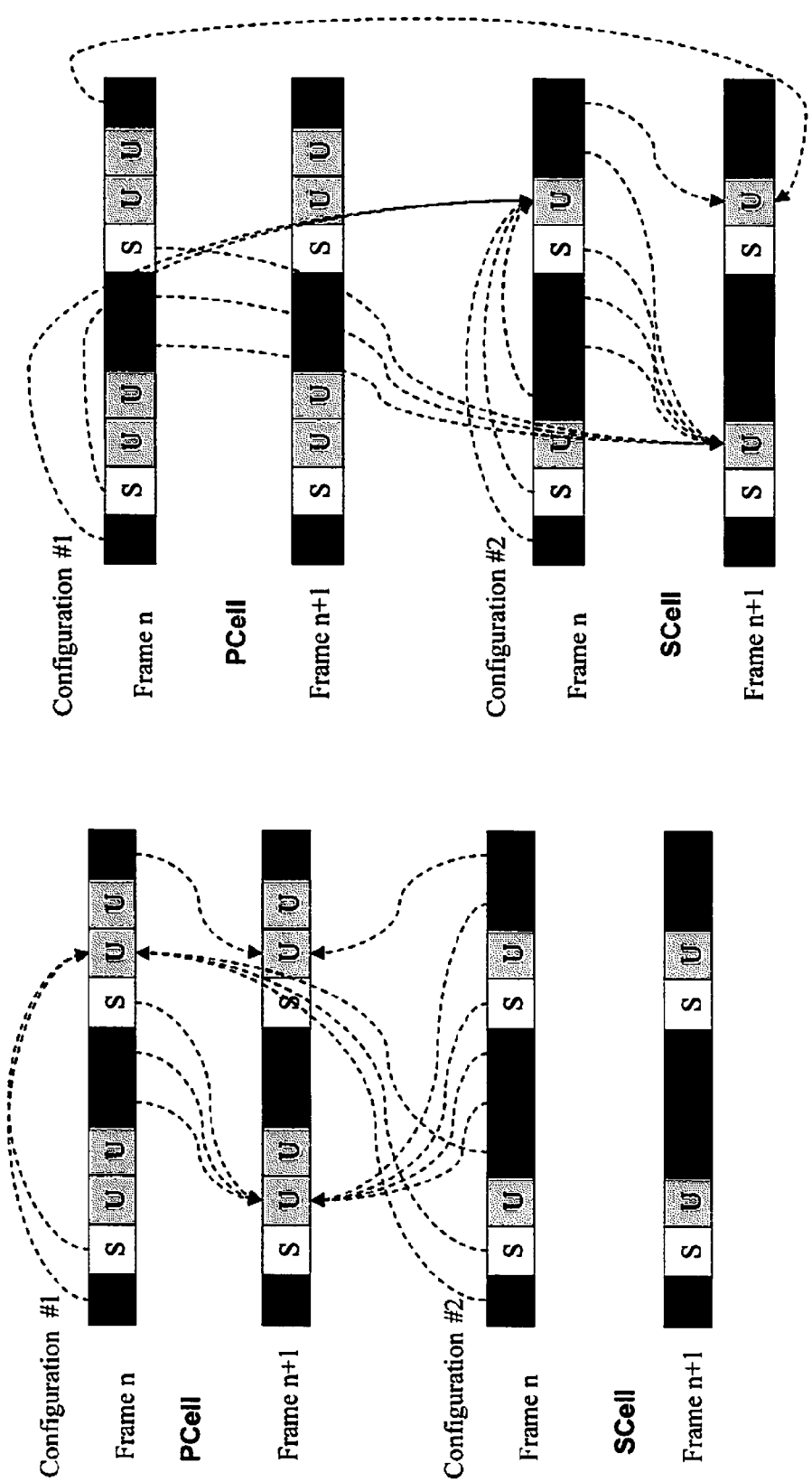
FIG. 18 is an illustration of PDSCH A/N feedback timings for aggregation of a configuration 1 cell and a configuration 2 cell, according to some of the example embodiments.

The PDSCH A/N feedback timings for aggregation of a configuration 1 cell and a configuration 2 cell is shown in FIG. 18. The analysis confirms that A/N feedbacks for all PDSCH in both the Pcell and the Scell are clearly assigned to suitable UL subframes on the Pcell.

Example Carrier Aggregation of Configuration 1 and 3 TDD Cells

To support the aggregation of configuration 1 and 3 TDD cells, the two HARQ control timing configuration numbers may be set as follows:

The UL control timing configuration number may be set to 6.

The DL HARQ control timing configuration number may be set to 4.

Note these configuration number settings are applicable regardless of which of the two TDD cells serves as the Pcell.

Figure 19:
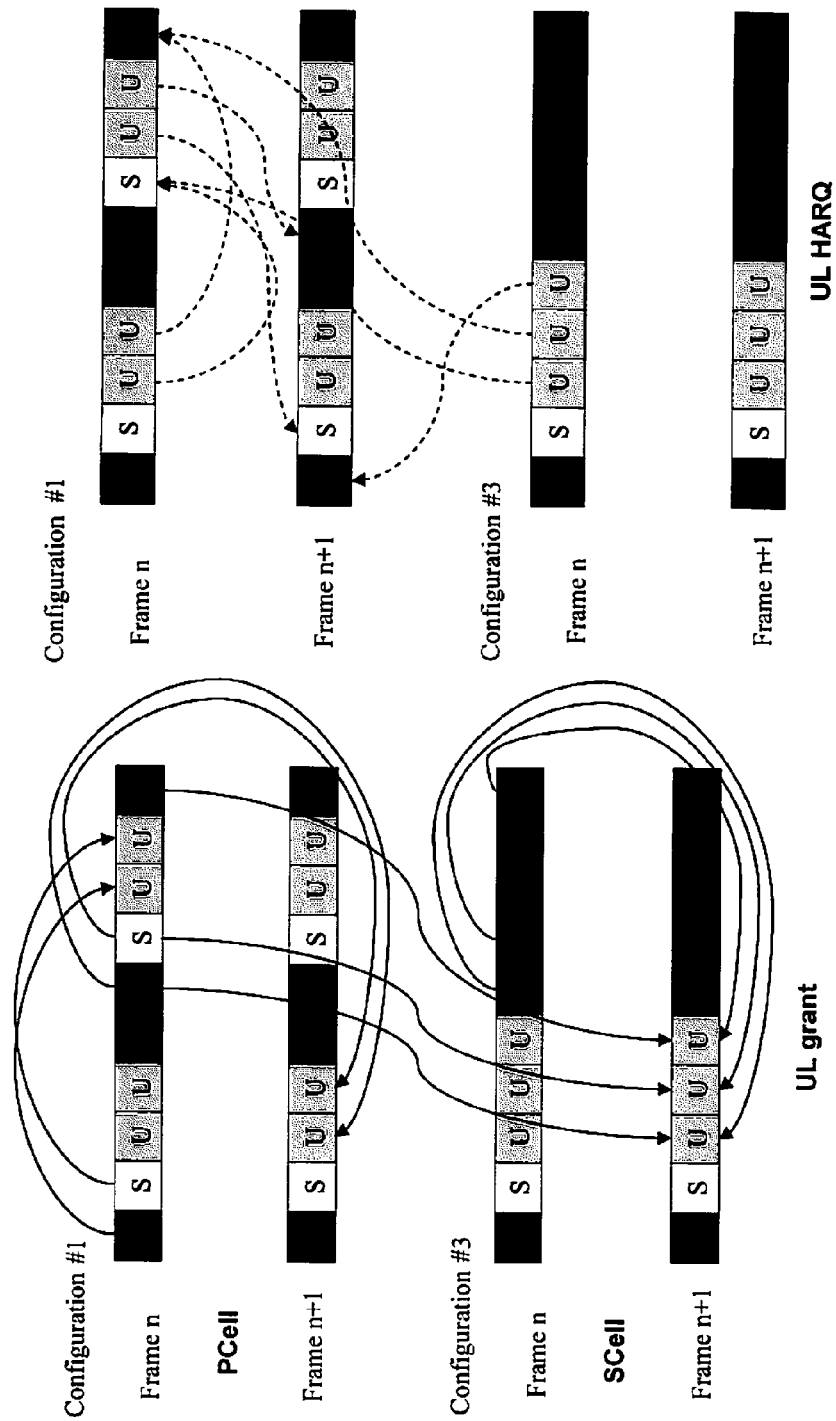
FIG. 19 is an illustration of PUSCH grant and A/N feedback timings for aggregation of a configuration 1 cell as Pcell and a configuration 3 cell as Scell, according to some of the example embodiments.
Figure 20:
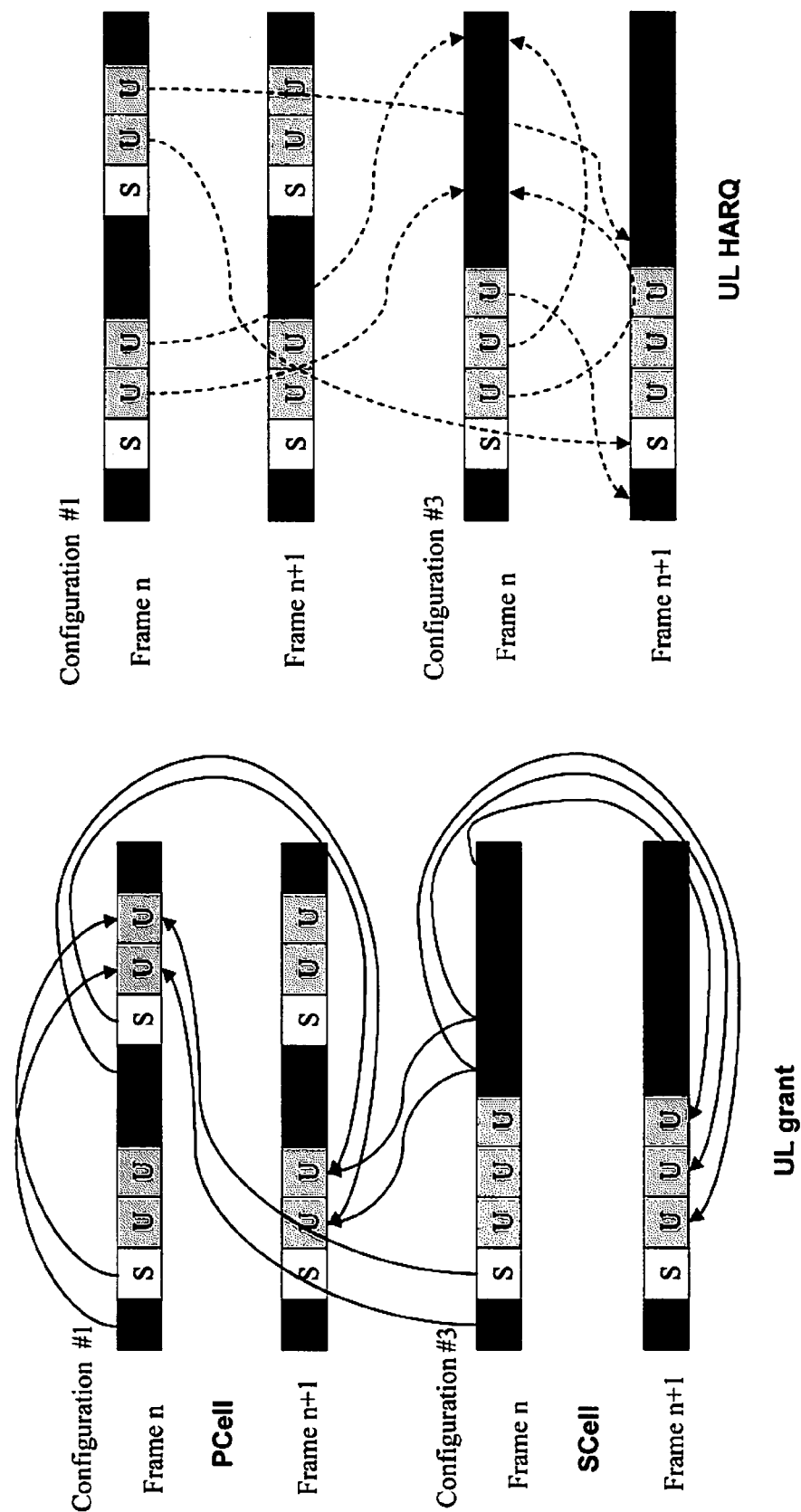
FIG. 20 is an illustration of PUSCH grant and A/N feedback timings for aggregation of a configuration 3 cell as Pcell and a configuration 1 cell as Scell, according to some of the example embodiments.

The PUSCH grant and A/N feedback timings (i.e., for uplink A/N feedback timing) for aggregation of a configuration 1 cell as Pcell and a configuration 3 cell as Scell are illustrated in FIG. 19. The PUSCH grant and A/N feedback timings for aggregation of a configuration 3 cell as Pcell and a configuration 1 cell as Scell are illustrated in FIG. 20. This analysis shows that all the UL subframes can be scheduled either from the Pcell (if cross-carrier scheduling is configured) or from the Scell itself (if cross-carrier scheduling is not configured). Furthermore, A/N feedback timings for all UL subframes are clearly assigned.

Figure 21:
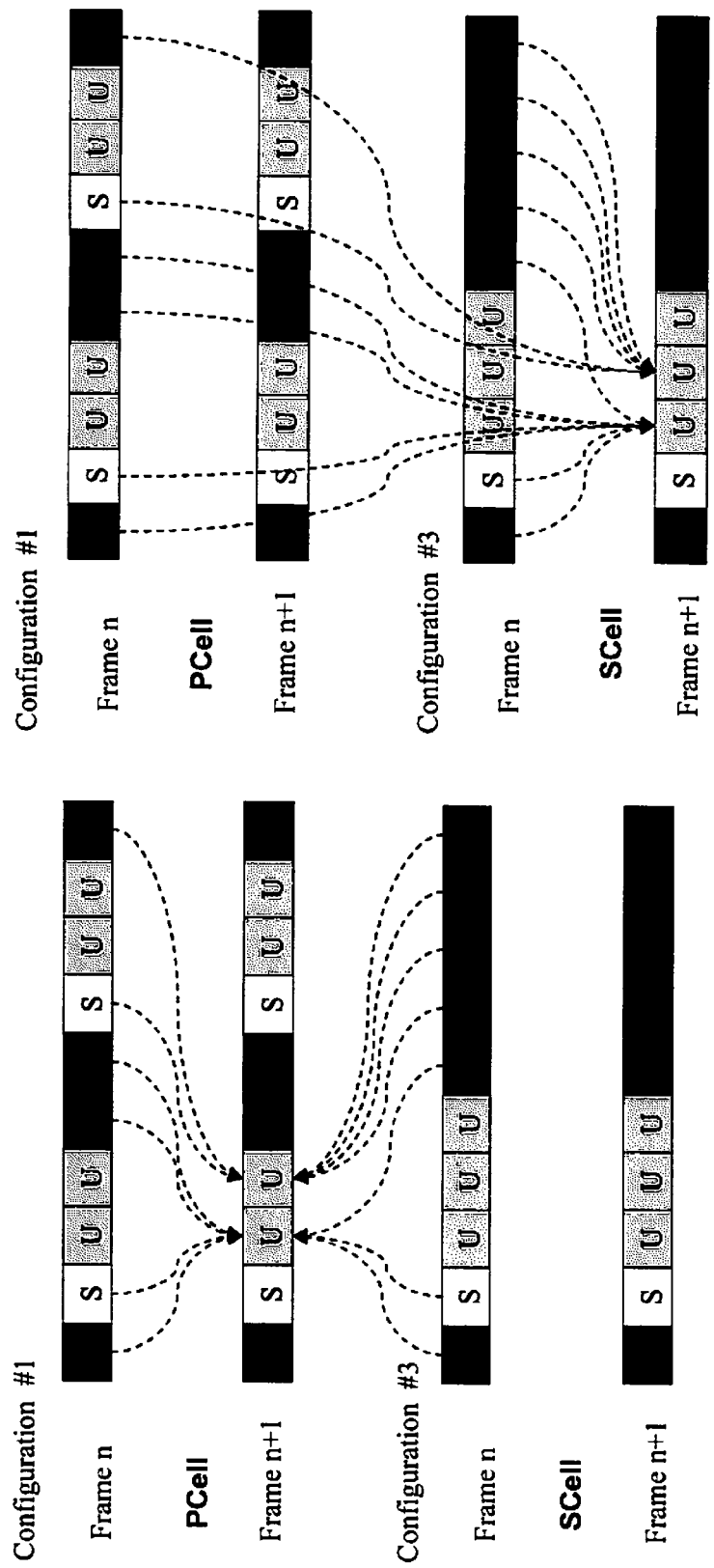
FIG. 21 is an illustration of PDSCH A/N feedback timings for aggregation of a configuration 1 cell and a configuration 3 cell, according to some of the example embodiments.

The PDSCH A/N feedback timings for aggregation of a configuration 1 cell and a configuration 3 cell is shown in FIG. 21. The analysis confirms that A/N feedbacks for all PDSCH in both the Pcell and the Scell are clearly assigned to suitable UL subframes on the Pcell.

Computation of the Subframe Timing Compatibility Based on Efficient Storage

As should be appreciated from above, according to some of the example embodiments, for a given set of aggregated TDD cells with different U/D control configurations, the UL control and DL HARQ control timing configuration numbers may be set based on a systematic rule encoded in the subframe timing compatibility hierarchy, for example as illustrated in FIG. 15.

The UL control and DL HARQ control timing configuration numbers so chosen may be different than any of the U/D configuration number of the aggregated cells.

The UL control timing configuration number may be set to the configuration number of a configuration that can be connected from all aggregated configurations with upward arrows in the subframe timing compatibility hierarchy in FIG. 15. If more than one configuration number can be chosen, a setting may be chosen to be the configuration at the lowest level in the subframe compatibility hierarchy. This setting results in more DL subframes for PUSCH grant and A/N feedback.

The DL HARQ control timing configuration number may be set to the configuration number of a configuration that can be connected from all aggregated configurations with downward arrows in the subframe timing compatibility hierarchy in FIG. 15. If more than one configuration number can be chosen, the setting may be chosen to be the configuration at the highest level in the subframe timing compatibility hierarchy. This setting results in more UL subframes for PDSCH A/N feedback.

Some of the example embodiments may also be directed towards efficient digital representation and storage methods of the subframe timing compatibility hierarchy. Some of the example embodiments may also be directed towards efficient computational methods and a corresponding apparatus for computing the UL control timing configuration number and the DL HARQ control timing configuration number.

According to some of the example embodiments, the subframe timing compatibility hierarchy may be represented with a table of sets. The UL control timing configuration number and the DL HARQ control timing configuration number may be computed with set intersection operations. If there is more than one control timing configuration number candidates after the set intersection operations, the network node can select a preferred control timing configuration number setting based on at least system loads and user equipment application needs.

An UL control timing configuration candidate set and a DL HARQ control timing configuration candidate set may be stored for each of the LTE cell U/D configurations. An example of the specific values of the candidate sets are shown in the table provided below.

TABLE 4

Control Timing Configuration Sets

| Component cell U/D configuration | UL control timing configuration candidate set | DL HARQ control timing configuration candidate set |
| --- | --- | --- |
| 0 | {0} | {0, 6, 1, 3, 2, 4, 5} |
| 1 | {1, 6, 0} | {1, 2, 4, 5} |
| 2 | {2, 1, 6, 0} | {2, 5} |
| 3 | {3, 6, 0} | {3, 4, 5} |
| 4 | {4, 1, 3, 6, 0} | {4, 5} |
| 5 | {5, 2, 4, 1, 3, 6, 0} | {5} |
| 6 | {6, 0} | {6, 1, 3, 2, 4, 5} |

According to some of the example embodiments, for a given set of cell U/D configurations to be aggregated, the UL control timing configuration number may be set to a configuration number from the intersection of all UL control timing configuration candidate sets corresponding to the cell U/D configurations to be aggregated. The following example cases are provided below for the purpose of explaining some of the example embodiments.

Example Case 1:

If cells with configuration 1 and 2 are aggregated, the corresponding UL control timing configuration candidate sets may be {1,6,0} and {2,1,6,0}. The intersection of all these sets can be computed to be {1,6,0}. Therefore, the UL control timing configuration number can be set to 1, 6 or 0.

Example Case 2:

If cells with configuration 1 and 3 are aggregated, the corresponding UL control timing configuration candidate sets may be {1,6,0} and {3,6,0}. The intersection of all these set can be computed to be {6,0}. Therefore, the UL control timing configuration number can be set to 6 or 0.

Example Case 3:

If cells with configuration 1, 3 and 4 are aggregated, the corresponding UL control timing configuration candidate sets may be {1,6,0}, {3,6,0} and {4,1,3,6,0}. The intersection of all these set can be computed to be {6,0}. Therefore, the UL control timing configuration number can be set to 6 or 0.

According to some of the example embodiments, for a given set of cell U/D configurations to be aggregated, the DL HARQ control timing configuration number may be set to a configuration number from the intersection of all DL HARQ control timing configuration candidate sets corresponding to the cell U/D configurations to be aggregated. The following example cases are provided below for the purpose of explaining some of the example embodiments.

Example Case 1:

If cells with configuration 1 and 2 are aggregated, the corresponding DL HARQ control timing configuration candidate sets may be {1,2,4,5} and {2,5}. The intersection of all these sets can be computed to be {2,5}. Therefore, the DL HARQ control timing configuration number can be set to 2 or 5.

Example Case 2:

If cells with configuration 1 and 3 are aggregated, the corresponding DL HARQ control timing configuration candidate sets may be {1,2,4,5} and {3,4,5}. The intersection of all these sets may be computed to be {4,5}. Therefore, the DL HARQ control timing configuration number can be set to 4 or 5.

Example Case 3:

If cells with configuration 1, 3 and 4 are aggregated, the corresponding DL HARQ control timing configuration candidate sets may be {1,2,4,5}, {3,4,5} and {4,5}. The intersection of all of these sets may be computed to be {4,5}. Therefore, the DL HARQ control timing configuration number can be set to 4 or 5.

If there are more than one control timing configuration number candidates after the set intersection operations, the network node or user equipment can select and signal a preferred control timing configuration number setting based on at least system loads and user equipment application needs. Signaling of the control timing could for example be done with radio resource control (RRC) signaling.

It should also be appreciated that, according to some of the example embodiments, the subframe timing compatibility hierarchy may be represented with a table of ordered sets. The UL control timing configuration number and the DL HARQ control timing configuration number may be computed with set intersection operations while preserving the order of numbers within the set. The chosen control timing configuration number may be the first or last number after the set intersection operation.

An UL control timing configuration candidate set and a DL HARQ control timing configuration candidate set may be stored for each of the LTE cell U/D configurations. The specific values of the candidate or ordered sets are shown in table 4. The order of candidate configuration numbers in each of the candidate sets shown in the table may be preserved in storage.

For a given set of cell U/D configurations to be aggregated, the UL control timing configuration number may be set to a configuration number from the intersection of all UL control timing configuration candidate sets corresponding to the cell U/D configurations to be aggregated, where the set intersection operations preserve the ordering of numbers in the concerned sets. The following example cases are provided below for the purpose of explaining some of the example embodiments.

Example 1

If cells with configuration 1 and 2 are aggregated, the corresponding UL control timing configuration candidate or ordered sets may be {1,6,0} and {2,1,6,0}. The intersection of all these set can be computed to be {1,6,0}. Therefore, the chosen UL control timing configuration number may be 1.

Example 2

If cells with configuration 1 and 3 are aggregated, the corresponding UL control timing configuration candidate or ordered sets may be {1,6,0} and {3,6,0}. The intersection of all these set can be computed to be {6,0}. Therefore, the chosen UL control timing configuration number may be 6.

Example 3

If cells with configuration cells 1, 3 and 4 are aggregated, the corresponding UL control timing configuration candidate or ordered sets may be {1,6,0}, {3,6,0} and {4,1,3,6,0}. The intersection of all these set can be computed to be {6,0}. Therefore, the chosen UL control timing configuration number may be 6.

For a given set of cell U/D configurations to be aggregated, the DL HARQ control timing configuration number may be set to a configuration number from the intersection of all DL HARQ control timing configuration candidate sets corresponding to the cell U/D configurations to be aggregated, where the set intersection operations preserve the ordering of numbers in the concerned sets. The following example cases are provided below for the purpose of explaining some of the example embodiments.

Example 1

If cells with configuration 1 and 2 are aggregated, the corresponding DL HARQ control timing configuration candidate or ordered sets may be {1,2,4,5} and {2,5}. The intersection of all these set can be computed to be {2,5}. Therefore, the chosen DL HARQ control timing configuration number may be 2.

Example 2

If cells with configuration 1 and 3 are aggregated, the corresponding DL HARQ control timing configuration candidate or ordered sets may be {1,2,4,5} and {3,4,5}. The intersection of all these set can be computed to be {4,5}. Therefore, the chosen DL HARQ control timing configuration number may be 4.

Example 3

If cells with configuration 1, 3 and 4 are aggregated, the corresponding DL HARQ control timing configuration candidate sets may be {1,2,4,5}, {3,4,5} and {4,5}. The intersection of all these set can be computed to be {4,5}. Therefore, the chosen DL HARQ control timing configuration number may be 4.

Examples of Half-Duplex Configuration Assignment

A user equipment capable of only half-duplex operations can perform either transmission or reception in a subframe but not both actions. Therefore, according to some of the example embodiments, subframes without conflicting U/D directions can be scheduled with PDCCH transmitted in the same subframe time (in-subframe scheduling).

For subframes with conflicting U/D directions across CCs, the half-duplex user equipments need to be informed of the scheduled directions in advance. Forward-subframe UL scheduling is already used in LTE. However, additional forward-subframe DL scheduling PDCCHs may be needed.

According to the example embodiments, the following features are designed for the forward-subframe DL scheduling PDCCHs:

If no cross-CC scheduling is configured, additional forward-subframe DL scheduling PDCCHs for the individual cells may be added (referred to as in-CC forward-subframe DL scheduling PDCCHs).

If cross-CC scheduling is configured, additional cross-CC forward-subframe DL scheduling PDCCHs from the Pcell may be added.

The forward-scheduling timing may be based on the UL grant timing of the same target cell. Other forward-scheduling timing methods may also be used.

The forward-subframe DL scheduling PDCCHs can be implemented according to the teaching of flexible carrier indicator.

Example Carrier Aggregation of Configuration 1 and 2 TDD Cells:

To support the aggregation of configuration 1 and 2 TDD cells, the two HARQ control timing configuration numbers may be set as follows:

The UL control timing configuration number may be set to 1.

The DL HARQ control timing configuration number may be set to 2.

For subframes with conflicting U/D directions across CCs, the half-duplex user equipments need to be informed of the scheduled directions in advance. Additional forward-subframe DL scheduling PDCCHs based on UL grant timings may be introduced as follows:

If configuration 1 is a Pcell and cross-CC scheduling is configured, two additional cross-CC forward-subframe DL scheduling PDCCHs (from the configuration 1 cell) are shown in FIG. 22.

If configuration 2 is a Pcell or if cross-CC scheduling is not configured, two additional in-CC forward-subframe DL scheduling PDCCHs (from the configuration 2 cell) are shown in FIG. 22.

Example Carrier Aggregation of Configuration 1 and 3 TDD Cells

To support the aggregation of configuration 1 and 3 TDD cells, the two HARQ control timing configuration numbers may be set as follows:

The UL control timing configuration number may be set to 6.

The DL HARQ control timing configuration number may be set to 4.

For subframes with conflicting U/D directions across CCs, the half-duplex UEs may need to be informed of the scheduled directions in advance. Additional forward-subframe DL scheduling PDCCHs based on UL grant timings may be introduced as follows:

If no cross-CC scheduling is configured, three in-CC forward-subframe DL scheduling PDCCHs from the Pcell and Scell may be added as shown in FIG. 23.

If cross-CC scheduling is configured, three cross-CC forward-subframe DL scheduling PDCCHs from the Pcell may be added as shown in FIG. 23.

Examples of Full-Duplex Configuration Assignment

A full-duplex user equipment can perform transmission and reception simultaneously in subframes with conflicting U/D directions across different CCs. According to the above teaching of the example embodiments, if cross-carrier scheduling is not configured, all DL subframes can be scheduled in-CC and in-subframe.

If cross-carrier scheduling is configured, in a subframe without conflicting directions, the DL subframes in the scheduling cell can carry the cross-carrier DL scheduling PDCCHs to schedule other DL subframes of the same subframe time on other cells. Furthermore, in a subframe with conflicting directions, if the scheduling cell is a DL subframe, PDCCH(s) can be sent from said subframe to schedule other DL subframes of the same subframe time on other cells. Additionally, in a subframe with conflicting directions, if the scheduling cell is an UL subframe, PDCCH(s) cannot be sent from said subframe to schedule other DL subframes of the same subframe time on other cells.

Thus, according to some of the example embodiments, cross-CC forward-subframe DL scheduling PDCCHs from the scheduling cell may be enabled. According to some of the example embodiments, the cross-CC forward-subframe DL scheduling PDCCHs designed in the example embodiments directed towards the half-duplex operations are applied to support full-duplex operations with certain cross-carrier scheduling scenarios.

Example Carrier Aggregation of Configuration 1 and 2 TDD Cells

To support the aggregation of configuration 1 and 2 TDD cells, the two HARQ control timing configuration numbers may be set as follows:

The UL control timing configuration number may be set to 1.

The DL HARQ control timing configuration number may be set to 2.

If configuration 2 is the Pcell, all DL subframes can be scheduled in-subframe and in-CC or cross-CC.

Figure 24:
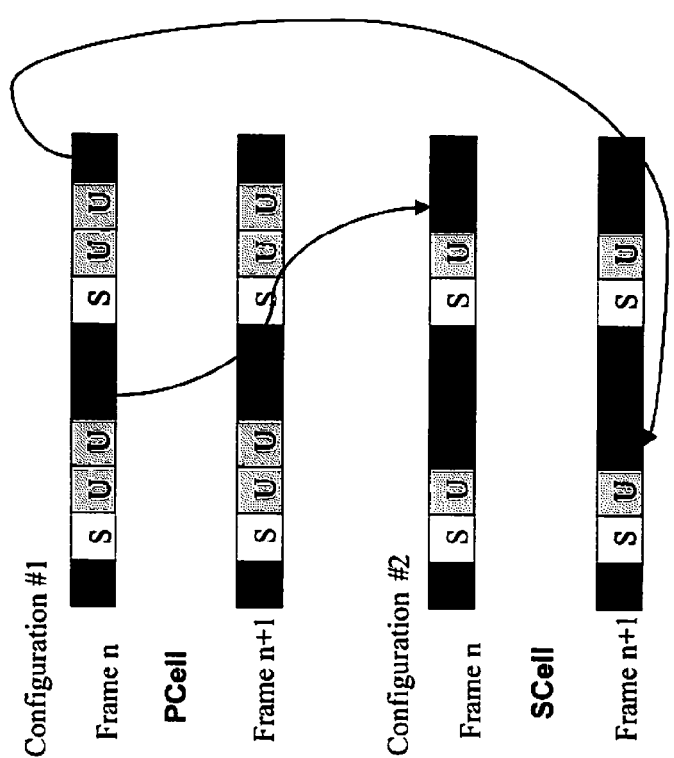
FIG. 24 is an illustrative example of the timing of additional cross-carrier forward-subframe DL scheduling PDCCHs in support of full-duplex UEs with aggregation of a configuration 1 cell as Pcell and a configuration 2 cell as Scell, according to some of the example embodiments.

If configuration 1 is the Pcell, if cross-CC scheduling is not configured, all DL subframes can be scheduled in-CC and in-subframe. If cross-scheduling is configured, all DL subframes in the Scell can be CC-scheduled in subframe except subframes 3 and 8. Note these two subframes are the subframes with conflicting U/D directions. Hence, the half-duplex solution can be reused here. The two subframes are scheduled with forward-subframe scheduling PDCCH based on the UL grant timings of these two subframes. The two additional cross-CC forward-subframe DL scheduling PDCCHs are shown in FIG. 24.

Example Carrier Aggregation of Configuration 1 and 3 TDD Cells

To support the aggregation of configuration 1 and 3 TDD cells, the two HARQ control timing configuration numbers may be set as follows:

The UL control timing configuration number may be set to 6.

The DL HARQ control timing configuration number may be set to 4.

If cross-CC scheduling is not configured, all DL subframes can be scheduled in-CC and in-subframe. If cross-scheduling is configured, all DL subframes in the Scell can be CC-scheduled in-subframe except subframes 7 and 8 in configuration 3 cannot be cross-scheduled in-subframe if configuration 1 is the Pcell. Additionally, subframe 4 cannot be cross-scheduled in-subframe if configuration 3 is the Pcell.

Figure 25:
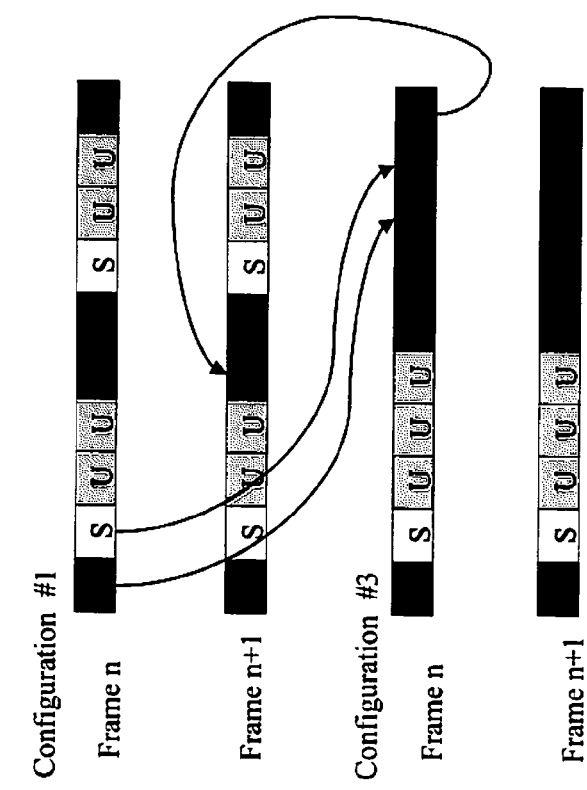
FIG. 25 is an illustrative example of the timing of additional cross-carrier forward-subframe DL scheduling PDCCHs in support of full-duplex UEs with aggregation of a configuration 1 cell and a configuration 3 cell, according to some of the example embodiments.

Using the half-duplex solution from the example embodiments directed towards half-duplex scheduling, two (if configuration 1 is the Pcell) or one (if configuration 3 is the Pcell) additional cross-CC forward-subframe DL scheduling PDCCHs based on the corresponding UL grant timings are used as shown in FIG. 25.

Examples of Forward Downlink Scheduling

The forward-subframe DL scheduling PDCCHs introduced in the example embodiments directed to half and full duplex assignment are new features and may require implementation complexity to integrate into existing network node hardware and software architecture. There is hence a benefit in reducing the need to rely on such new forward-subframe DL scheduling PDCCHs.

According to some of the example embodiments, the following two operation rules may be implemented on the user equipment for a subframe with conflicting directions across the aggregated CCs:

In full-duplex operations, a user equipment may monitor PDCCH(s) in scheduling CC(s) with the DL direction (even if the user equipment has been given in advance grant(s) to transmit in CC(s) with the UL direction).

In half-duplex operations, a user equipment may monitor PDCCH(s) in scheduling CC(s) with the DL direction if the user equipment has not been given in advance any grant to transmit in any CC with the UL direction.

Example Node Configurations

Figure 26:
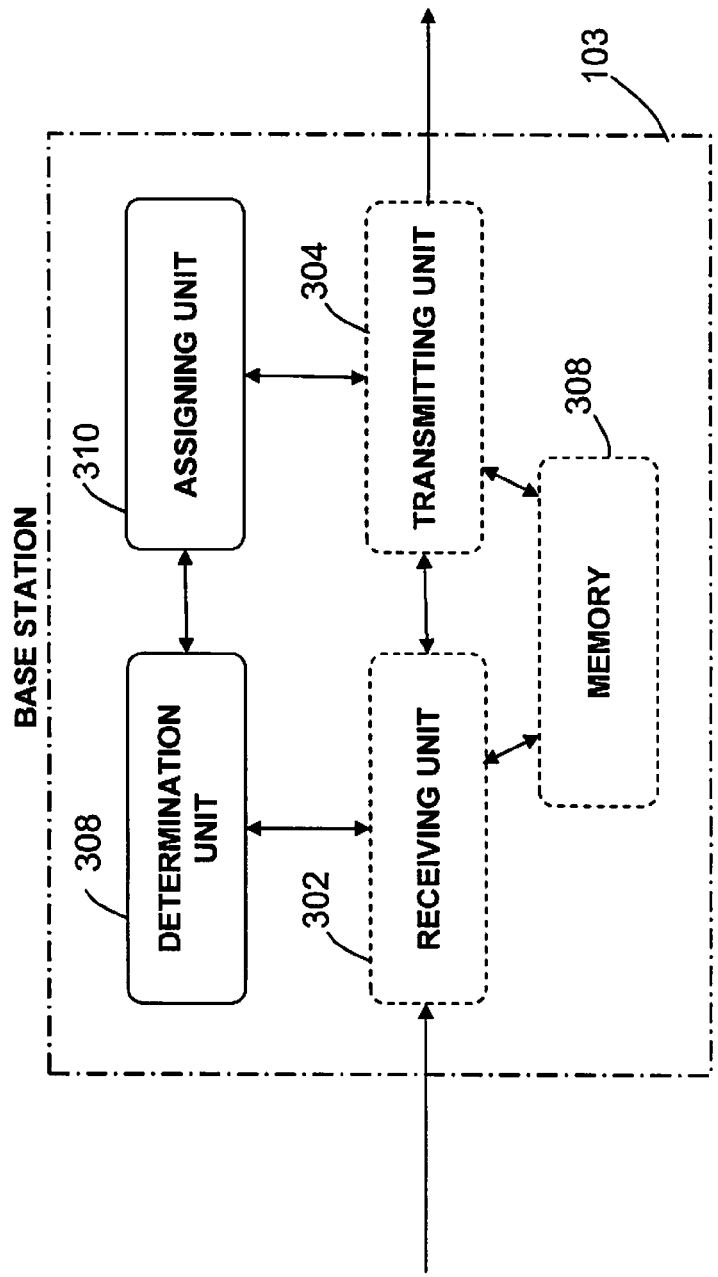
FIG. 26 is a schematic of a base station configured to perform the example embodiments described herein.

FIG. 26 illustrates an example of a base station 103 which may incorporate some of the example embodiments discussed above. As shown in FIG. 26, the base station 103 may comprise a receiving 302 and transmitting 304 units configured to receive and transmit, respectively, any form of communications or control signals within a network. It should be appreciated that the receiving 302 and transmitting 304 units may be comprised as a single transceiving unit. It should further be appreciated that the receiving 302 and transmitting 304 units, or transceiving unit, may be in the form of any input/output communications port known in the art.

The base station 103 may further comprise at least one memory unit 308 that may be in communication with the receiving 302 and transmitting 304 units. The memory unit 308 may be configured to store received or transmitted data and/or executable program instructions. The memory unit 308 may also be configured to store the timing compatibility hierarchy and/or control timing configuration candidate or ordered sets. The memory unit 308 may be any suitable type of computer readable memory and may be of volatile and/or non-volatile type.

The base station 103 further comprises a determination unit 308 which is configured to determine at least one timing configuration number for a plurality of aggregated cells.

The base station further comprises an assignment unit 310 which is configured to assign the uplink-downlink configuration to a user equipment 101.

The determination unit 308 and/or the assignment unit 310 may be any suitable type of computation unit, e.g. a microprocessor, digital signal processor (DSP), field programmable gate array (FPGA), or application specific integrated circuit (ASIC). It should be appreciated that the determination and/or the assignment unit may be comprised as a single unit or any number of units.

Figure 27:
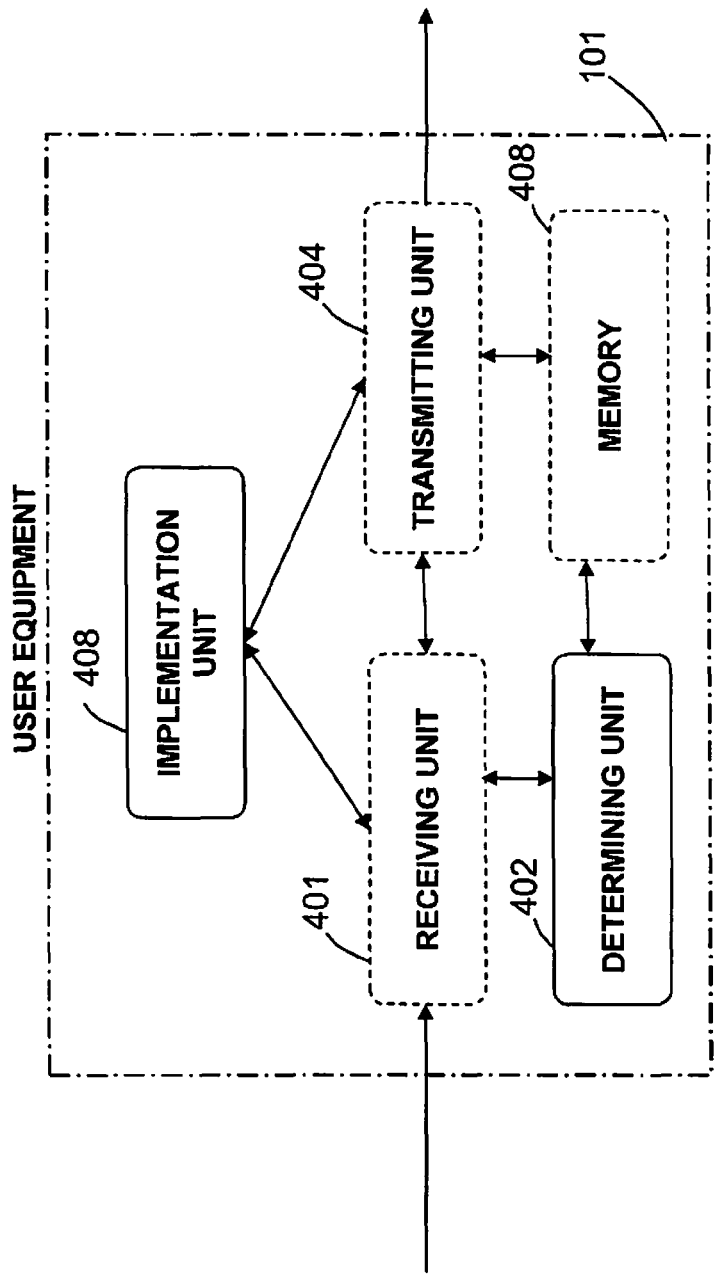
FIG. 27 is a schematic of a user equipment configured to perform the example embodiments described herein

FIG. 27 illustrates an example of a user equipment 101 which may incorporate some of the example embodiments discussed above. As shown in FIG. 27, the user equipment 101 may comprise a receiving 401 and transmitting 404 units configured to receive and transmit, respectively, any form of communications or control signals within a network. It should be appreciated that the receiving 401 and transmitting 404 units may be comprised as a single transceiving unit. It should further be appreciated that the receiving 401 and transmitting 404 units, or transceiving unit, may be in the form of any input/output communications port known in the art.

The user equipment 101 may further comprise at least one memory unit 408 that may be in communication with the receiving 402 and transmitting 404 units. The memory unit 408 may be configured to store received or transmitted data and/or executable program instructions. The memory unit 408 may also be configured to store the timing compatibility hierarchy and/or HARQ control timing configuration candidate or ordered sets. The memory unit 408 may be any suitable type of computer readable memory and may be of volatile and/or non-volatile type.

The user equipment 101 may further comprise an implementation unit 408 which may be configured to implement a control timing based on at least one timing configuration number. The user equipment 101 may also comprise a determining unit 402 that may be configured to receive or determine the at least one timing configuration number. The implementation unit 408 and/or the determining unit 402 may be any suitable type of computation unit, e.g. a microprocessor, digital signal processor (DSP), field programmable gate array (FPGA), or application specific integrated circuit (ASIC). It should be appreciated that the implementation unit and the determining unit need not be provided as two separate units but may be provided as a single or any number of units.

Example Node Operations

Figure 28:
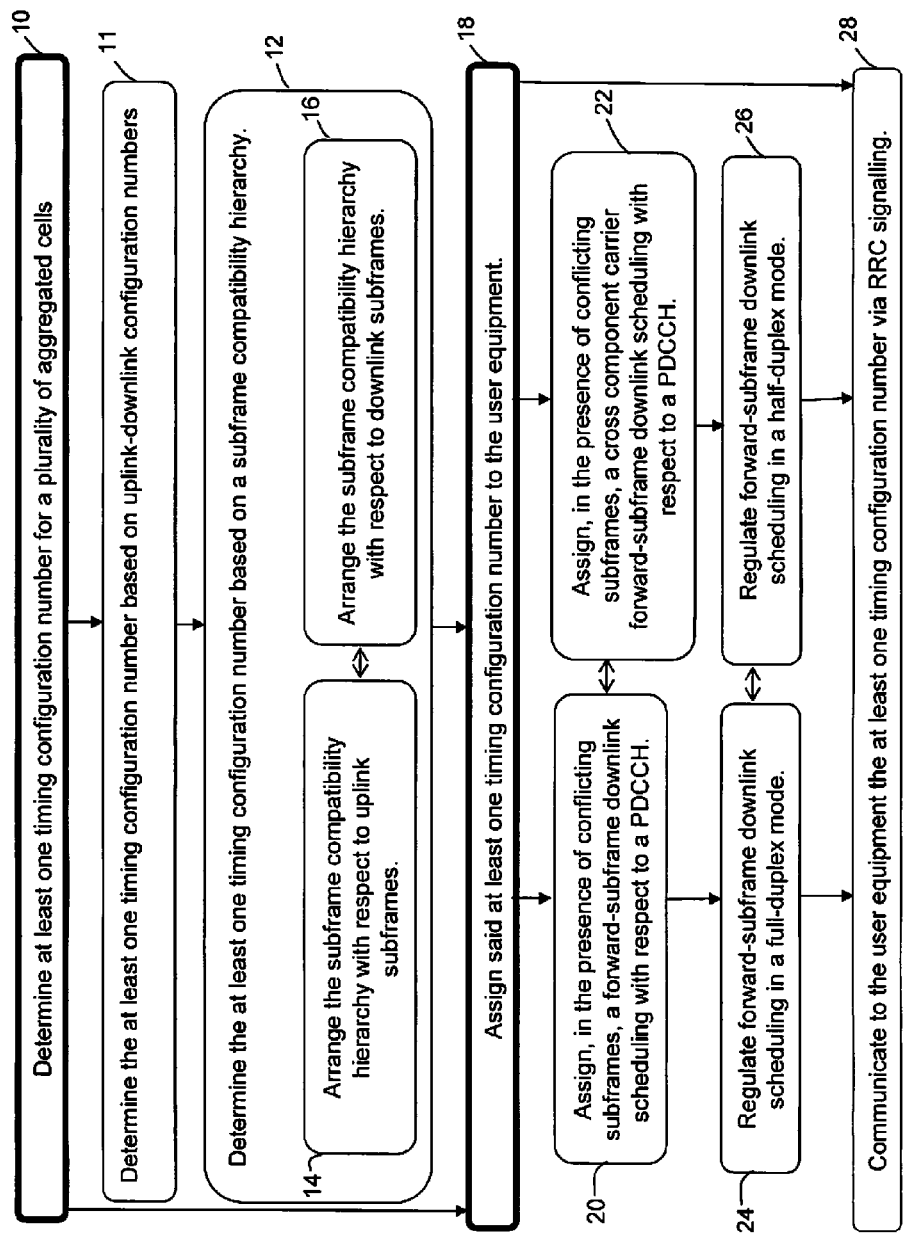
FIG. 28 is a flow diagram depicting example operations of the base station of FIG. 26.

FIG. 28 is a flow diagram depicting example operations which may be taken by the base station 103 of FIG. 26.

Example Operation 10

The base station determines 10 at least one timing configuration number for a plurality of aggregated cells of the multiple carrier network. Each aggregated cell is associated with an uplink-downlink configuration number. At least two uplink-downlink configuration numbers of the plurality of aggregated cells are not equal. The plurality of aggregated cells is associated with the user equipment. The determination unit 308 is configured to perform the determining 10.

According to some example embodiments, the at least one timing configuration number may be indicative of, or used to determine, a downlink HARQ control timing configuration for establishing downlink HARQ A/N timings across the plurality of aggregated cells. According to some of the example embodiments, the at least one timing configuration number may be indicative of, or used to determine, an uplink control timing configuration number for establishing uplink scheduling grant and/or A/N timings across the plurality of aggregated cells.

Example Operation 11

According to some of the example embodiments, the determining 10 may further comprise determining 11 the at least one timing configuration number based on the uplink-downlink configuration numbers of the plurality of aggregated cells. The determination unit 308 is configured to perform the determining 10.

In some of the example embodiments, the at least one timing configuration number may be determined to be equal to one of said uplink-downlink configuration numbers of the plurality of aggregated cells, for example as illustrated in Example Case 2 under the sub-heading Configuration Assignment. In some of the example embodiments, the at least one timing configuration number may be determined to not be equal to any of the uplink-downlink configuration numbers of said plurality of aggregated cells, for example as illustrated in Example Case 1 under the sub-heading Configuration Assignment. The at least one timing configuration number may be determined such that control data is transmitted to and from the use equipment and the network in a non-conflicting manner.

Example Operation 12

According to some of the example embodiments, the determining 10 may further comprise determining 12 the uplink-downlink configuration based on a subframe timing compatibility ordering, for example as illustrated in FIG. 15. The determination unit 308 may perform the determining 12.

Example Operation 14

According to some of the example embodiments, the determining 12 may further comprise arranging 14 the subframe timing compatibility ordering such that uplink-downlink configurations on a higher level of the ordering comprise uplink subframes that are a superset of all uplink subframes from uplink-downlink configurations on a lower level of the ordering. The determination unit may be configured to perform the arranging 14.

Example Operation 16

According to some of the example embodiments, the determining 12 may further comprise arranging 16 the subframe timing compatibility ordering such that uplink-downlink configurations on a lower level of the ordering comprise uplink subframes that are a superset of all downlink subframes from uplink-downlink configurations on a higher level of the ordering. The determination unit may be configured to perform the arranging 16.

Example Operation 18

The base station 103 assigns 18 the at least one timing configuration number to the user equipment. The assigning unit 310 is configured to perform the assigning 18.

Example Operation 20

According to some of the example embodiments, the assigning 18 may further comprise assigning 20, in the presence of conflicting subframes, a forward-subframe downlink scheduling with respect to a PDCCH, as explained in FIGS. 22-25. The assigning unit 310 may be configured to perform the assigning 20.

Example Operation 22

According to some of the example embodiments, the assigning 18 may further comprise assigning 22, in the presence of conflicting subframes, a cross component carrier forward subframe downlink scheduling with respect to a PDCCH, as explained in FIGS. 22, 24 and 25. The assigning unit 310 may be configured to perform the assigning 22.

Example Operation 24

According to some of the example embodiments, the method may further comprise regulating 24 a usage of forward-subframe downlink scheduling by monitoring, in a full-duplex mode of operation a PDCCH in a scheduling component carrier with a downlink subframe, if the user equipment has been given an advance grant to transmit carrier components in an uplink direction. The assignment unit and/or determination unit may perform the regulating 24.

Example Operation 26

According to some of the example embodiments, the method may also comprise regulating 26 a usage of a forward-subframe downlink scheduling by monitoring, in a half-duplex mode of operation, a PDCCH in a scheduling component carrier with a downlink subframe, if the user equipment has not been given an advance grant to transmit carrier components in an uplink direction. The assignment unit and/or determination unit may perform the regulating 26.

Example Operation 28

According to some of the example embodiments, the method may also comprise communication 28 to the user equipment the at least one timing configuration number via RRC signaling. The determination unit and/or transmitting unit may perform the communication 28.

Figure 29:
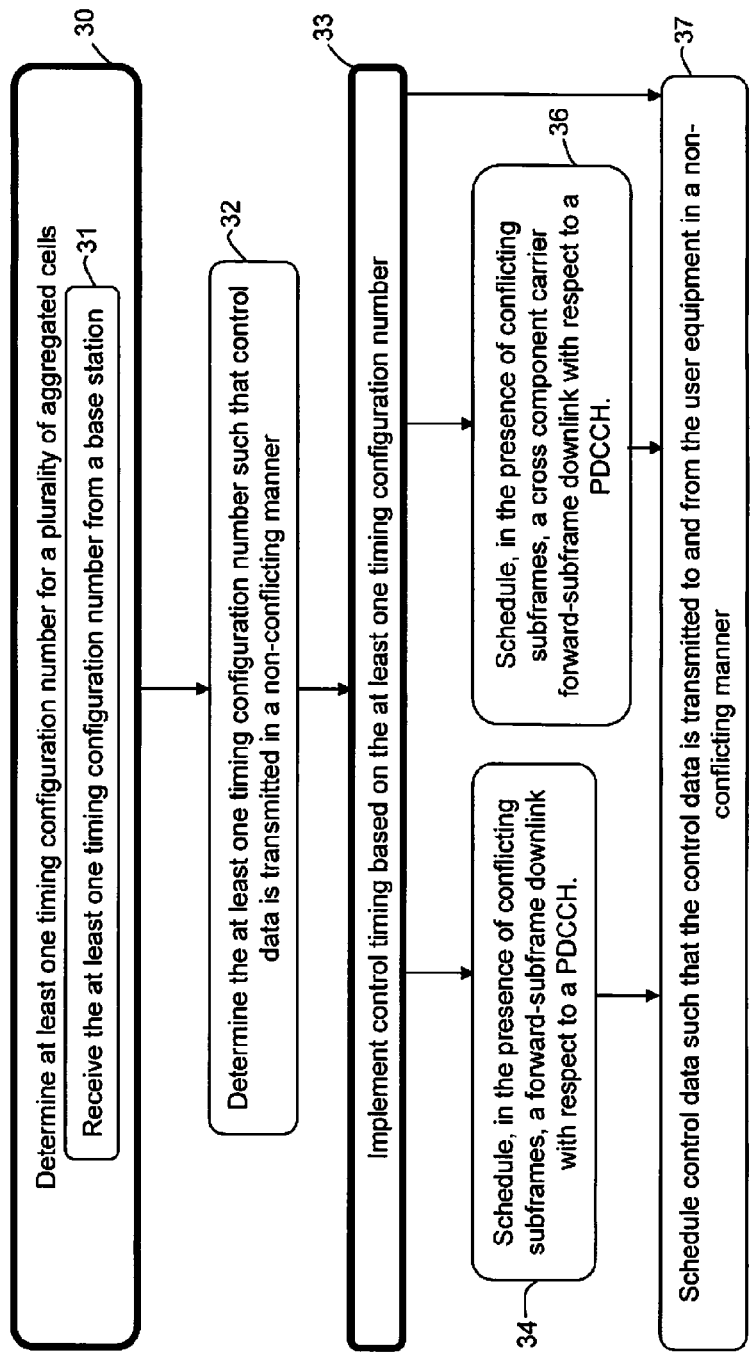
FIG. 29 is a flow diagram depicting example operations of the user equipment of FIG. 27.

FIG. 29 is a flow diagram depicting example operations which may be taken by the user equipment 101 of FIG. 27.

Example Operation 30

The user equipment determines 30 at least one timing configuration number for a plurality of aggregated cells of the multiple carrier network, where each aggregated cell is associated with an uplink-downlink configuration number, where at least two uplink-downlink configuration numbers of the plurality of aggregated cells are not equal. The plurality of aggregated cells is associated with the user equipment. The determination 308 is configured to perform the determining 30.

According to some example embodiments, the at least one timing configuration number may be indicative of, or used to determine HARQ control timing configuration for establishing downlink HARQ A/N timings across the plurality of aggregated cells. According to some of the example embodiments, the at least one timing configuration number may be indicative of, or used to determine, an uplink control timing configuration number for establishing uplink scheduling grant and/or A/N timings across the plurality of aggregated cells.

Example Operation 31

According to some of the example embodiments, the determining 30 may further comprise receiving 31 the at least one timing configuration from a base station. It should be appreciated that the at least one timing configuration number may be received via RRC signaling. The determining unit and/or receiving unit may be configured to perform the receiving 31.

Example Operation 32

According to some of the example embodiments, the determining 30 may further comprise determining 32 the at least one timing configuration number such that control data is transmitted to and from the user equipment and the network in a non-conflicting manner. The determining unit may be configured to perform the determining 32.

Example Operation 33

The user equipment 101 implements 33 control timing based on the at least one timing configuration number. The implementation unit 408 is configured to perform the implementing operation.

In some of the example embodiments, the at least one timing configuration number may be implemented to be equal to one of said uplink-downlink configuration numbers of the plurality of aggregated cells, for example as illustrated in Example Case 2 under the sub-heading Configuration Assignment. In some of the example embodiments, the at least one timing configuration number may be implemented to not be equal to any of the uplink-downlink configuration numbers of said plurality of aggregated cells, for example as illustrated in Example Case 1 under the sub-heading Configuration Assignment.

Example Operation 34

According to some of the example embodiments, the implementing 33 may further comprise scheduling 34, in the presence of conflicting subframes, a forward-subframe downlink with respect to a PDCCH. The implementation unit 408 may be configured to perform the scheduling 34.

Example Operation 36

According to some of the example embodiments, the implementing 33 may further comprise scheduling 36, in the presence of conflicting subframes, a cross component carrier forward-subframe downlink with respect to a PDCCH. The implementation unit 408 may be configured to perform the scheduling 36.

Example Operation 37

According to some of the example embodiments, the implementing 33 may further comprise scheduling 37 control data, based on the at least one timing configuration, such that the control data is transmitted to and from the user equipment and the network in a non-conflicting manner.

Conclusion

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc.

Although the description is mainly given for a user equipment, as measuring or recording unit, it should be understood by the skilled in the art that "user equipment" is a non-limiting term which means any wireless device, terminal, or node capable of receiving in DL and transmitting in UL (e.g. PDA, laptop, mobile, sensor, fixed relay, mobile relay or even a radio base station, e.g. femto base station).

A cell is associated with a radio node, where a radio node or radio network node or eNodeB used interchangeably in the example embodiment description, comprises in a general sense any node transmitting radio signals used for measurements, e.g., eNodeB, macro/micro/pico base station, home eNodeB, relay, beacon device, or repeater. A radio node herein may comprise a radio node operating in one or more frequencies or frequency bands. It may be a radio node capable of CA. It may also be a single- or multi-RAT node. A multi-RAT node may comprise a node with co-located RATs or supporting multi-standard radio (MSR) or a mixed radio node.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, in a base station, for configuring control timing to and from a user equipment in a multiple cell communications network, wherein each cell of the multiple cell communications network is associated with an uplink-downlink configuration indexed by an uplink-downlink configuration number, wherein different uplink-downlink configurations define different resources for uplink and downlink transmission, the method comprising:

determining at least one timing configuration number for configuring the timing of control signalling across a plurality of aggregated cells associated with the user equipment, each aggregated cell being associated with one of said uplink-downlink configuration numbers, wherein at least two uplink-downlink configuration numbers of the plurality of aggregated cells are not equal, and wherein each of the at least one timing configuration number is one of said uplink-downlink configuration numbers; and assigning the at least one timing configuration number to the user equipment;

wherein the at least one timing configuration number is indicative of:

a downlink Hybrid-Automatic Repeat Request (HARQ) control timing configuration for establishing downlink HARQ acknowledgement/negative-acknowledgement (HARQ A/N) timings across the plurality of aggregated cells, and/or an uplink control timing configuration number for establishing uplink scheduling grant and/or acknowledgement/negative-acknowledgement (A/N) timings across the plurality of aggregated cells.

2. The method of claim 1 wherein the at least one timing configuration number is indicative of a downlink HARQ control timing configuration for establishing downlink HARQ A/N timings across the plurality of aggregated cells.

3. The method of claim 1 wherein the at least one timing configuration number is indicative of an uplink control timing configuration number for establishing uplink scheduling grant and/or A/N timings across the plurality of aggregated cells.

4. The method of claim 1 wherein the at least one timing configuration number is equal to one of the uplink-downlink configuration numbers of the plurality of aggregated cells.

5. The method of claim 1 wherein the at least one timing configuration number is not equal to any of the uplink-downlink configuration numbers of the plurality of aggregated cells.

6. The method of claim 1 wherein the determining comprises determining the at least one timing configuration number such that control data is transmitted, to and from the user equipment and the network, in a non-conflicting manner.

7. The method of claim 1 wherein the determining comprises determining the at least one timing configuration number based on the uplink-downlink configuration numbers of the plurality of aggregated cells.

8. The method of claim 7 wherein the determining further comprises determining the at least one timing configuration number based on a subframe timing compatibility ordering.

9. The method of claim 8 wherein the determining further comprises arranging the subframe timing compatibility ordering such that uplink-downlink configurations on a higher level of the ordering comprise uplink subframes that are a superset of all uplink subframes from uplink-downlink configurations on a lower level of the ordering.

10. The method of claim 8 wherein the determining further comprises arranging the subframe timing compatibility ordering such that uplink-downlink configurations on a lower level of the ordering comprise downlink subframes that are a superset of all downlink subframes from uplink-downlink configurations on a higher level of the ordering.

11. The method of claim 1 wherein the assigning comprises communicating the at least one timing configuration number to the user equipment via radio resource control (RRC) signaling.

12. The method of claim 1 wherein the assigning comprises assigning, in response to the presence of conflicting subframes, a forward-subframe downlink scheduling timing with respect to a physical downlink control channel (PDCCH).

13. The method of claim 1 wherein the assigning comprises assigning, in response to the presence of conflicting subframes, a cross component carrier forward-subframe downlink scheduling timing with respect to a physical downlink control channel (PDCCH).

14. A base station for configuring control timing to and from a user equipment in a multiple cell communications network, wherein each cell of the multiple cell communications network is associated with an uplink-downlink configuration indexed by an uplink-downlink configuration number, wherein different uplink-downlink configurations define different resources for uplink and downlink transmission, the base station comprising a processor and a memory, said memory containing instructions executable by said processor whereby said device is operative to implement:
a determination unit configured to determine at least one timing configuration number for configuring the timing of control signalling across a plurality of aggregated cells associated with the user equipment, each aggregated cell being associated with one of said uplink-downlink configuration numbers, wherein at least two uplink-downlink configuration numbers of the plurality of aggregated cells are not equal, and wherein each of the at least one timing configuration number is one of said uplink-downlink configuration numbers; and
an assignment unit configured to assign the at least one timing configuration number to the user equipment;
wherein the at least one timing configuration number is indicative of:
a downlink Hybrid-Automatic Repeat Request (HARQ) control timing configuration for establishing downlink HARQ acknowledgement/negative-acknowledgement (HARQ A/N) timings across the plurality of aggregated cells, and/or
an uplink control timing configuration number for establishing uplink scheduling grant and/or acknowledgement/negative-acknowledgement (A/N) timings across the plurality of aggregated cells.

15. The base station of claim 14 wherein the at least one timing configuration number is indicative of a HARQ control timing configuration for establishing downlink HARQ A/N timings across the plurality of aggregated cells.

16. The base station of claim 14 wherein the at least one timing configuration number is indicative of an uplink control timing configuration number for establishing uplink scheduling grant and/or A/N timings across the plurality of aggregated cells.

17. The base station of claim 14 wherein the at least one timing configuration number is equal to one of the uplink-downlink configuration numbers of the plurality of aggregated cells.

18. The base station of claim 14 wherein the at least one timing configuration number is not equal to any of the uplink-downlink configuration numbers of the plurality of aggregated cells.

19. The base station of claim 14 wherein the determination unit is configured to determine the at least one timing configuration number such that control data is transmitted, to and from the user equipment and the network, in a non-conflicting manner.

20. The base station of claim 14 wherein the determination unit is configured to determine the at least one timing configuration number based on the uplink-downlink configuration numbers of the plurality of aggregated cells.

21. The base station of claim 20 wherein the determination unit is configured to determine the at least one timing configuration number further based on a subframe timing compatibility ordering.

22. The base station of claim 21 wherein the subframe timing compatibility ordering is arranged such that uplink-downlink configurations on a higher level of the ordering comprise uplink subframes that are a superset of all uplink subframes from uplink-downlink configurations on a lower level of the ordering.

23. The base station of claim 21 wherein the subframe timing compatibility ordering is arranged such that uplink-downlink configurations on a lower level of the ordering comprise downlink subframes that are a superset of all downlink subframes from uplink-downlink configurations on a higher level of the ordering.

24. The base station of claim 14 wherein the assignment unit is further configured to communicate to the user equipment the at least one timing configuration number via radio resource control (RRC) signaling.

25. The base station of claim 14 wherein the assignment unit is configured to assign, in response to the presence of conflicting subframes, a forward-subframe downlink scheduling timing with respect to a physical downlink control channel (PDCCH).

26. The base station of claim 14 wherein the assignment unit is configured to assign, in response to the presence of conflicting subframes, a cross component carrier forward-subframe downlink scheduling timing with respect to a physical downlink control channel (PDCCH).

27. A method, in a user equipment, for a configuration of control timing for a user equipment in a multiple cell communications network, wherein each cell of the multiple cell communications network is associated with an uplink-downlink configuration indexed by an uplink-downlink configuration number, wherein different uplink-downlink configurations define different resources for uplink and downlink transmission, the method comprising:
 determining at least one timing configuration number for configuring the timing of control signalling across a plurality of aggregated cells associated with the user equipment, each aggregated cell being associated with one of said uplink-downlink configuration numbers, wherein at least two uplink-downlink configuration numbers of the plurality of aggregated cells are not equal, and wherein each of the at least one timing configuration number is one of said uplink-downlink configuration numbers; and
 implementing control timing based on the at least one timing configuration number;
 wherein the at least one timing configuration number is indicative of:
  a downlink Hybrid-Automatic Repeat Request (HARQ) control timing configuration for establishing downlink HARQ acknowledgement/negative-acknowledgement (HARQ A/N) timings across the plurality of aggregated cells, and/or
  an uplink control timing configuration number for establishing uplink scheduling grant and/or acknowledgement/negative-acknowledgement (A/N) timings across the plurality of aggregated cells.

28. The method of claim 27 wherein the at least one timing configuration number is indicative of a downlink HARQ control timing configuration for establishing downlink HARQ A/N timings across the plurality of aggregated cells.

29. The method of claim 27 wherein the at least one timing configuration number is indicative of an uplink control timing configuration number for establishing uplink scheduling grant and/or A/N timings across the plurality of aggregated cells.

30. The method of claim 27 wherein the at least one timing configuration number is equal to one of the uplink-downlink configuration numbers of the plurality of aggregated cells.

31. The method of claim 27 wherein the at least one timing configuration number is not equal to any of the uplink-downlink configuration numbers of the plurality of aggregated cells.

32. The method of claim 27 wherein the implementing comprises scheduling control data, based on that at least one timing configuration number, such that the control data is transmitted, to and from the user equipment and the network, in a non-conflicting manner.

33. The method of claim 27 wherein the determining comprises receiving the at least one timing configuration from a base station.

34. The method of claim 33 wherein the at least one timing configuration is received via radio resource control (RRC) signaling.

35. The method of claim 27 wherein the determining comprises determining the at least one timing configuration number such that control data is transmitted to and from the user equipment and the network in a non-conflicting manner.

36. The method of claim 27 wherein the implementing comprises scheduling, in response to the presence of conflicting subframes, a forward-subframe downlink scheduling timing with respect to a physical downlink control channel (PDCCH).

37. The method of claim 27 wherein the implementing comprises scheduling, in response to the presence of conflicting subframes, a cross component carrier forward-subframe downlink scheduling timing with respect to a physical downlink control channel (PDCCH).

38. A user equipment, for a configuration of control timing for a user equipment in a multiple cell communications network, wherein each cell of the multiple cell communications network is associated with an uplink-downlink configuration indexed by an uplink-downlink configuration number, wherein different uplink-downlink configurations define different resources for uplink and downlink transmission, the user equipment comprising a processor and a memory, said memory containing instructions executable by said processor whereby said device is operative to implement:
 a determining unit configured to determine at least one timing configuration number for configuring the timing of control signalling across a plurality of aggregated cells associated with the user equipment, each aggregated cell being associated with one of said uplink-downlink configuration numbers, wherein at least two uplink-downlink configuration numbers of the plurality of aggregated cells are not equal, and wherein each of the at least one timing configuration number is one of said uplink-downlink configuration numbers; and
 an implementation unit configured to implement control timing based on the at least one timing configuration number:,
 wherein the at least one timing configuration number is indicative of:
  a downlink Hybrid-Automatic Repeat Request (HARQ) control timing configuration for establishing downlink HARQ acknowledgement/negative-acknowledgement (HARQ A/N) timings across the plurality of aggregated cells, and/or
  an uplink control timing configuration number for establishing uplink scheduling grant and/or acknowledgement/negative-acknowledgement (A/N) timings across the plurality of aggregated cells.

39. The user equipment of claim 38 wherein the at least one timing configuration number is indicative of a downlink HARQ control timing configuration for establishing downlink HARQ A/N timings across the plurality of aggregated cells.

40. The user equipment of claim 38 wherein the at least one timing configuration number is indicative of an uplink control timing configuration number for establishing uplink scheduling grant and/or A/N timings across the plurality of aggregated cells.

41. The user equipment of claim 38 wherein the at least one timing configuration number is equal to one of the uplink-downlink configuration numbers of the plurality of aggregated cells.

42. The user equipment of claim 38 wherein the at least one timing configuration number is not equal to any of the uplink-downlink configuration numbers of the plurality of aggregated cells.

43. The user equipment of claim 38 wherein the implementation unit is further configured to schedule control data, based on the at least one timing configuration number, such that control data is transmitted, to and from the user equipment and the network, in a non-conflicting manner.

44. The user equipment of claim 38 wherein the determining unit is further configured to receive, from a base station, the at least one timing configuration number.

45. The user equipment of claim 44 wherein the at least one timing configuration number is received via radio resource control (RRC) signaling.

46. The user equipment of claim 38 wherein the implementation unit is configured to implement the at least one timing configuration number such that control data is transmitted to and from the user equipment and the network in a non-conflicting manner.

47. The user equipment of claim 38 wherein the implementation unit is further configured to schedule, in response to the presence of conflicting subframes, a forward-subframe downlink scheduling timing with respect to a physical downlink control channel (PDCCH).

48. The user equipment of claim 38 wherein the implementation unit is further configured to schedule, in response to the presence of conflicting subframes, a cross component carrier forward-subframe downlink scheduling timing with respect to a physical downlink control channel (PDCCH).

49. The method of claim 1, wherein the assigning further comprises assigning one timing configuration number for uplink control timing and one timing configuration number for downlink control timing.

50. The method of claim 1, wherein the uplink-downlink configurations are time division duplex (TDD) configurations.

51. The method of claim 27 wherein the implementing further comprises implementing uplink control timing based on a first timing configuration number and implementing downlink control timing based on a second timing configuration number that is different than the first timing configuration number.

52. The method of claim 27 wherein the uplink-downlink configurations are time division duplex (TDD) configurations.

* * * * *

UNITED STATES PATENT AND TRADEMARK OFFICE
CERTIFICATE OF CORRECTION

PATENT NO. : 9,295,055 B2
APPLICATION NO. : 13/510201
DATED : March 22, 2016
INVENTOR(S) : Jung-Fu Cheng et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 680 days.

Signed and Sealed this
Twenty-sixth Day of July, 2016

Michelle K. Lee
*Director of the United States Patent and Trademark Office*